United States Patent
Lin et al.

(10) Patent No.: US 11,520,181 B2
(45) Date of Patent: Dec. 6, 2022

(54) FLEXIBLE, ADJUSTABLE LENS POWER LIQUID CRYSTAL CELLS AND LENSES

(71) Applicant: COOPERVISION INTERNATIONAL LIMITED, Fareham (GB)

(72) Inventors: Hung-Chun Lin, Nantou (TW); Yu-Jen Wang, Taipei (TW); Hao-Ren Lo, Miaoli (TW); Yi-Hsin Lin, Hsinchu (TW)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 17/235,722

(22) Filed: Apr. 20, 2021

(65) Prior Publication Data

US 2021/0240035 A1   Aug. 5, 2021

Related U.S. Application Data

(62) Division of application No. 16/138,675, filed on Sep. 21, 2018, now Pat. No. 11,003,016.

(51) Int. Cl.
*G02F 1/1335* (2006.01)
*G02F 1/1333* (2006.01)
(Continued)

(52) U.S. Cl.
CPC .. *G02F 1/133526* (2013.01); *G02F 1/133305* (2013.01); *G02F 1/133723* (2013.01); *G02F 1/134309* (2013.01)

(58) Field of Classification Search
None
See application file for complete search history.

(56) References Cited

U.S. PATENT DOCUMENTS

| 5,084,778 A | 1/1992 | DeJule et al. |
| 5,103,331 A | 4/1992 | Taniguchi et al. |

(Continued)

FOREIGN PATENT DOCUMENTS

| CN | 1405583 A | 3/2003 |
| CN | 1273856 C | 9/2006 |

(Continued)

OTHER PUBLICATIONS

AU 2018442118—First Office Action dated May 14, 2021, 2 pages.
(Continued)

*Primary Examiner* — Ryan Crockett
(74) *Attorney, Agent, or Firm* — Haynes Beffel & Wolfeld LLP; Andrew L. Dunlap

(57) ABSTRACT

A flexible optical element adopting liquid crystals (LCs) as the materials for realizing electrically tunable optics is foldable. A method for manufacturing the flexible element includes patterned photo-polymerization. The LC optics can include a pair of LC layers with orthogonally aligned LC directors for polarizer-free properties, flexible polymeric alignment layers, flexible substrates, and a module for controlling the electric field. The lens power of the LC optics can be changed by controlling the distribution of electric field across the optical zone. Lens power control can be provided using combinations of electrode configurations, drive signals and anchoring strengths in the alignment layers.

20 Claims, 25 Drawing Sheets

(51) Int. Cl.
    *G02F 1/1337*     (2006.01)
    *G02F 1/1343*     (2006.01)

(56) References Cited

U.S. PATENT DOCUMENTS

| | | | |
|---|---|---|---|
| 5,535,026 | A | 7/1996 | Fujimori et al. |
| 5,729,319 | A | 3/1998 | Inou et al. |
| 6,040,947 | A | 3/2000 | Kurtin et al. |
| 6,184,967 | B1 | 2/2001 | Lagerwall et al. |
| 6,816,149 | B1 * | 11/2004 | Alsleben ............. G06F 3/03543 374/161 |
| 6,836,374 | B2 | 12/2004 | Esch et al. |
| 6,851,805 | B2 | 2/2005 | Blum et al. |
| 7,009,757 | B2 | 3/2006 | Nishioka et al. |
| 7,018,040 | B2 | 3/2006 | Blum et al. |
| 7,123,319 | B2 | 10/2006 | Broer et al. |
| 7,308,167 | B2 | 12/2007 | Trott et al. |
| 7,369,327 | B1 * | 5/2008 | Nishioka ............... G03B 17/20 359/720 |
| 7,375,784 | B2 | 5/2008 | Smith et al. |
| 7,404,636 | B2 | 7/2008 | Blum et al. |
| 7,532,303 | B2 | 5/2009 | Kato et al. |
| 7,808,707 | B2 | 10/2010 | Cano et al. |
| 7,891,809 | B2 | 2/2011 | Ballet et al. |
| 8,052,278 | B2 | 11/2011 | Bovet et al. |
| 8,079,702 | B2 | 12/2011 | Ballet et al. |
| 8,172,397 | B2 | 5/2012 | Ballet et al. |
| 8,231,217 | B2 | 7/2012 | Ballet et al. |
| 8,330,933 | B2 | 12/2012 | Lin et al. |
| 8,885,139 | B2 | 11/2014 | Peyghambarian et al. |
| 8,906,088 | B2 | 12/2014 | Pugh et al. |
| 8,928,854 | B2 | 1/2015 | Chen et al. |
| 9,155,614 | B2 | 10/2015 | Blum et al. |
| 9,268,154 | B2 | 2/2016 | Pugh et al. |
| 9,366,881 | B2 | 6/2016 | Pugh et al. |
| 9,429,799 | B2 | 8/2016 | Galstian et al. |
| 9,810,912 | B2 | 11/2017 | Wang et al. |
| 9,869,885 | B2 | 1/2018 | De Sio et al. |
| 9,910,246 | B2 | 3/2018 | Zohrabyan et al. |
| 10,859,868 | B2 | 12/2020 | Lin et al. |
| 11,003,016 | B2 | 5/2021 | Lin et al. |
| 2003/0038912 | A1 | 2/2003 | Broer et al. |
| 2006/0227271 | A1 * | 10/2006 | Park .................... G02F 1/13394 349/156 |
| 2007/0229754 | A1 * | 10/2007 | Galstian ................ G02F 1/29 349/200 |
| 2007/0268417 | A1 | 11/2007 | Kato et al. |
| 2007/0279539 | A1 | 12/2007 | Suzuki et al. |
| 2008/0208335 | A1 | 8/2008 | Blum et al. |
| 2009/0174855 | A1 | 7/2009 | Andrews et al. |
| 2010/0053539 | A1 * | 3/2010 | Lin ........................ G02F 1/29 349/200 |
| 2011/0049768 | A1 * | 3/2011 | Hu ........................ D01F 11/04 526/320 |
| 2011/0109824 | A1 * | 5/2011 | Galstian ................ C09K 19/02 252/570 |
| 2011/0234934 | A1 * | 9/2011 | Chang .................. G02F 1/13471 349/74 |
| 2012/0188490 | A1 * | 7/2012 | Zohrabyan ........ G02F 1/134309 349/123 |
| 2012/0212696 | A1 | 8/2012 | Trajkovska et al. |
| 2012/0262663 | A1 * | 10/2012 | Chin ....................... G02B 3/14 349/200 |
| 2013/0250197 | A1 | 9/2013 | Khodadad et al. |
| 2013/0314632 | A1 * | 11/2013 | Zohrabyan ............. G02B 7/28 349/36 |
| 2014/0049682 | A1 * | 2/2014 | Galstian .................. G03B 3/10 348/356 |
| 2014/0078583 | A1 | 3/2014 | DeMeio et al. |
| 2014/0131444 | A1 | 5/2014 | Wang |
| 2015/0029424 | A1 | 1/2015 | Gordon et al. |
| 2015/0077658 | A1 | 3/2015 | Pugh et al. |
| 2015/0077659 | A1 | 3/2015 | Pugh et al. |
| 2015/0077660 | A1 | 3/2015 | Pugh et al. |
| 2015/0077661 | A1 | 3/2015 | Pugh et al. |
| 2015/0077662 | A1 | 3/2015 | Pugh et al. |
| 2015/0077663 | A1 | 3/2015 | Pugh et al. |
| 2015/0077699 | A1 | 3/2015 | De Sio et al. |
| 2015/0077700 | A1 | 3/2015 | De Sio et al. |
| 2015/0081016 | A1 | 3/2015 | De Sio et al. |
| 2015/0138454 | A1 | 5/2015 | Pugh et al. |
| 2015/0160475 | A1 | 6/2015 | Yang et al. |
| 2015/0198830 | A1 * | 7/2015 | Galstian ..................... C08J 3/28 349/36 |
| 2015/0219893 | A1 | 8/2015 | Chen et al. |
| 2015/0268494 | A1 | 9/2015 | Yamaguchi et al. |
| 2015/0378177 | A1 * | 12/2015 | Blum ................... A61F 2/1616 351/159.39 |
| 2016/0062141 | A1 * | 3/2016 | De Sio ................... G02C 7/022 349/13 |
| 2016/0170097 | A1 | 6/2016 | Milton et al. |
| 2016/0320684 | A1 | 11/2016 | Galstian |
| 2018/0107090 | A1 | 4/2018 | Gordon et al. |
| 2019/0049784 | A1 | 2/2019 | Lin et al. |
| 2020/0096814 | A1 | 3/2020 | Lin et al. |

FOREIGN PATENT DOCUMENTS

| | | |
|---|---|---|
| CN | 101014889 A | 8/2007 |
| CN | 101930093 A | 12/2010 |
| CN | 102067242 A | 5/2011 |
| CN | 102741740 A | 10/2012 |
| CN | 104635351 A | 5/2015 |
| CN | 104708838 A | 6/2015 |
| CN | 105589214 A | 5/2016 |
| CN | 106291785 A | 1/2017 |
| CN | 107219641 A | 9/2017 |
| EP | 1291705 A2 | 3/2003 |
| EP | 1546787 A2 | 6/2005 |
| EP | 1947501 A2 | 7/2008 |
| EP | 2555046 A1 | 2/2013 |
| EP | 2848980 A2 | 3/2015 |
| EP | 2848981 A1 | 3/2015 |
| EP | 2848982 A2 | 3/2015 |
| EP | 2848983 A2 | 3/2015 |
| EP | 2848984 A2 | 3/2015 |
| EP | 2848985 A2 | 3/2015 |
| EP | 2848986 A2 | 3/2015 |
| EP | 2848987 A2 | 3/2015 |
| EP | 2851737 A1 | 3/2015 |
| EP | 2851743 A1 | 3/2015 |
| EP | 3223066 A1 | 9/2017 |
| JP | 2004184966 A | 7/2004 |
| JP | 2006171681 A | 6/2006 |
| JP | 2009139455 A | 6/2009 |
| JP | 2010032860 A | 2/2010 |
| JP | 2015060223 A | 3/2015 |
| JP | 2018036634 A | 3/2018 |
| TW | 201133039 A | 10/2011 |
| TW | 201400881 A | 1/2014 |
| TW | 201910872 A | 3/2019 |
| WO | 0242832 A2 | 5/2002 |
| WO | 2005006035 A1 | 1/2005 |
| WO | 2008091859 A1 | 7/2008 |
| WO | 2008103906 A2 | 8/2008 |
| WO | 2009153764 A2 | 12/2009 |
| WO | 2012037684 A1 | 3/2012 |
| WO | 2013096781 A1 | 6/2013 |
| WO | 2015015205 A1 | 2/2015 |
| WO | 2015024323 A1 | 2/2015 |
| WO | 2016078238 A1 | 5/2016 |

OTHER PUBLICATIONS

GB2104129.8—First Office Action dated May 24, 2021, 2 pages.
PCT Search Report and Written Opinion from PCT/GB2018/052152 dated Oct. 26, 2018, 17 pages.
Ye et al., "Reducing Driving Voltages for Liquid Crystal Lens Using Weakly Conductive Thin Film," J. Appl. Phys. 47(6), Jun. 13, 2008 pp. 4597-4599.

(56) References Cited

OTHER PUBLICATIONS

Chen et al. "A large bistable negative lens by integrating a polarization switch with a passively anisotropic focusing element," Optics Express, vol. 22, Issue 11, pp. 13138-13145, Jun. 2, 2014.
Chen et al. "Electrically Tunable Ophthalmic Lenses for Myopia and Presbyopia Using Liquid Crystals," Molecular Crystals and Liquid Crystals, v. 596, Issue 1, Sep. 30, 2014, 11 pages.
Ishinabe et al. "A Foldable Ultra-Thin LCD Using a Coat-Debond Polyimide Substrate and Polymer Walls," SID 9-1: Distinguished Paper, May 25, 2016, 4 pages.
Lin et al. "A polarizer-free flexible and reflective electro-optical switch using dye-doped liquid crystal gels," Opt. Express 16, Feb. 4, 2008, 1777-1785.
Lin et al., "A Review of Electrically Tunable Focusing Liquid Crystal Lenses," Transactions on Electrical and Electronic Vlaterials, vol. 12, No. 6, Dec. 25, 2011, pp. 234-240.
Lin et al., "Electrically Tunable Liquid Crystal Lenses and Applications," Molecular Crystals and Liquid Crystals, vol. 596, Issue 1, Sep. 30, 2014, 12 pages.
Lin et al., "Electrically tunable-focusing and polarizer-free liquid crystal lenses for ophthalmic applications," OSA Publishing, Optics Express, vol. 21, Issue 8, Apr. 9, 2013, 9 pages.
PCT/GB2018/052152—Response to Written Opinion with Chapter II Demand and Article 34 Amendments filed May 2, 2019, 22 pages.
PCT/GB2018/052152—Written Opinion dated Jul. 5, 2019, 7 pages.
PCT/GB2018/053311 Partial Search Report dated May 21, 2019, 12 pages.
PCT/GB2018/053311—International Search Report and Written Opinion dated Aug. 30, 2019, 20 pages.
PCT/GB2018/053311—Written Opinion of the International Preliminary Examining Authority dated Oct. 19, 2020, 6 pages.
Stohr et al, "Liquid crystal alignment by rubbed polymer surfaces: a microscopic bond orientation model," Journal of Electron Spectroscopy and Related Phenomena, v. 98-99, Jan. 1999, pp. 189-207.
Thomas et al. "Liquid Crystals," downloaded from https://www.mpikg.mpg.de/886863/Liquid_Crystals.pdf, at least as aarly as Jun. 2017, 44 pages.
U.S. Office Action from U.S. Appl. No. 16/045,024 dated Mar. 20, 2020, 6 pages.
Wang et al. "A simple and robust way towards reversible mechanochromism: Using liquid crystal elastomer as a mask," Extreme Mechanics Letters, v. 1, Feb. 2017, pp. 42-48.
PCT/GB2018/052152—International Preliminary Report on Patentability, dated Dec. 3, 2019, 9 pages.
TW 107126605 First Office Action, dated Dec. 25, 2019, 11 pages.
TW 107126605 Notice of Allowance, dated Jun. 22, 2020, 9 pages.
CA 3072532—Voluntary Amendment filed Mar. 26, 2020, 52 pages.
CA 3072532—Notice of Allowance, dated Nov. 1, 2021, 1 page.
CN 201880058484.1—Second Office Action, dated Oct. 26, 2021, 4 pages.
JP 2020-507628—First Office Action, dated Feb. 24, 2022, 8 pages.
MX/a/2020/001612, Voluntary Amendments, dated Mar. 3, 2020, 10 pages.
MX/a/2020/001612—Notice of Allowance dated Mar. 16, 2022, 3 pages.
GB 2003134.0—Office Action, dated Jan. 6, 2022, 2 pages.
PCT/GB2018/053311—Article 34 Amendments, dated Jul. 21, 2020, 28 pages.
PCT/GB2018/053311—International Preliminary Report on Patentability, dated Dec. 21, 2020, 8 pages.
CA 3112968—Office Action, dated Nov. 15, 2021, 6 pages.
CN 201880097725.3—Second Office Action dated Dec. 24, 2021, 11 pages.
JP 2021515454—Notice of Allowance, dated Nov. 29, 2021, 4 pages.
MY PI2021001188—Certificate of Grant, dated Oct. 15, 2021, 3 pages.
AU 2018442118—Notice of Acceptance, dated Nov. 10, 2021, 3 pages.
KR 20217011337—Notice of Allowance translation, dated Jan. 21, 2022, 2 pages.
SG 10202104155R—Voluntary Amendments, dated Oct. 22, 2021, 11 pages.
GB 2117022.0—Office Action, dated Feb. 17, 2022, 2 pages.
SG 11202102170Y Written Opinion, dated Oct. 15, 2021, 7 pages.
U.S. Appl. No. 17/100,581—Office Action, dated Oct. 28, 2021, 8 pages.

* cited by examiner (f1, V1)

(f2, V2)

FLEXIBLE, ADJUSTABLE LENS POWER LIQUID CRYSTAL CELLS AND LENSES

PRIORITY APPLICATION

This application is a divisional of co-pending U.S. patent application Ser. No. 16/138,675 filed 21 Sep. 2018; which application is incorporated herein by reference.

BACKGROUND

Field

The present invention relates to electroactive optics and lenses using such optics and, in particular, to flexible liquid crystal cells and lenses.

Description of Related Art

As soft contact lenses are handled by contact lens wearers, they are subject to deformation. In some cases, the lenses may be folded in half over short folding radii, as small as 2 millimeters or so. Thus, the soft contact lens should be flexible enough to endure this deformation without damage over reasonable useable lifetime. It is desirable also that the lens be elastic in the sense that it is capable of recovering its size and shape and of retaining the optical properties of the lens after recovering from the deformation. A number of polymers, including hydrogel contact lenses and silicone hydrogel contact lenses, have been developed with flexibility and elasticity in mind.

In electroactive lenses, the electroactive components, such as liquid crystal cells, can be embedded in a lens body made of a flexible and elastic polymer. However, electroactive components can limit both the flexibility and the elasticity of the lens body as a whole.

It is desirable to provide a lens with electroactive components that is both flexible and elastic.

SUMMARY

An electrically tunable lens is described that comprises first and second alignment layers, with an active layer comprising liquid crystal confined between the first and second alignment layers in an optical path of the lens. Embodiments are described in which a first electrode is disposed above the first alignment layer and has a first patterned opening, such as a circular hole, disposed over an aperture region of the active layer. Also a second electrode is disposed below the second alignment layer, and has a second patterned opening arranged to induce, in combination with the first electrode, an electric field in the active layer. The first and second patterned openings can be circular in shape. In some embodiments, the first and second patterned openings have circular shapes with a common radius. In some embodiments, the first and second patterned openings have circular shapes with different radii.

In flexible or elastic versions of the embodiments including first and second electrodes having patterned openings, and in other embodiments described herein, an array of elastic polymer posts is disposed in the active layer, configured to maintain the thickness of the active layer after bending and recovery of its original shape.

Embodiments of the electrically tunable lens described herein can have resistive layers disposed above the first alignment layer and below the second alignment layer to improve dispersion of the electric field lines through the active layer.

One or both of the first and second alignment layers can comprise a polymeric layer including liquid crystal moieties.

In some embodiments, a third alignment layer is disposed between the first and second alignment layers, and a second active layer comprising liquid crystal is confined between the third alignment layer and the second alignment layer. A pad electrode can be disposed between the first and second active layers.

In the embodiment including first and second electrodes having patterned openings, and in other embodiments described herein, a driver can be electrically connected to the first and second electrodes. The driver can be configured to apply a drive signal across the first and second electrodes. In various embodiments, the driver can apply a drive signal having an adjustable duty cycle. The driver can apply a drive signal using pulse width modulation. The driver can apply a drive signal having a DC offset.

In some embodiments, the driver can apply a drive signal that includes an initial higher field power interval followed by a subsequent lower field power interval, where the lower field power interval is configured to establish a target lens power during the lower field power interval. The combination of the higher field power interval followed by the lower field power interval can reduce disclination of liquid crystal moieties in the active layers, particularly near the edges of the aperture region of the lens.

In embodiments described herein, at least one of the first and second alignment layers has an anchoring strength greater than $10^{-4}$ J/m$^2$. Embodiments are described in which alignment layers comprise polymeric layers including liquid crystal moieties, having an anchoring strength greater than $10^{-4}$ J/m$^2$. Polymeric layers of this type can be flexible and can be elastic.

Also, an electrically tunable lens is described that comprises first, second, third and fourth alignment layers, having a first active layer comprising liquid crystal between the first and second alignment layers, and a second active layer comprising liquid crystal between the third and fourth alignment layers. The first electrode is disposed above the first alignment layer and has a first patterned opening disposed in alignment with an aperture of the first active layer. A second electrode is disposed below the fourth active layer, and has a second patterned opening disposed in alignment with an aperture of the second active layer. A pad electrode is disposed between the first and second active layers. A driver is electrically connected to the first and second electrodes and to the pad electrode. The driver is configured to apply a first drive signal to the first electrode and a second drive signal to the second electrode. The pad electrode can be maintained at a reference potential such as ground, or otherwise used in the generation of the first and second drive signals. The drive signals are arranged to induce, in combination with the pad electrode, electric fields in the first and second active layers to tune the optical power of the lens. Many of the features discussed above can be applied to this type of electrically tunable lens having two active layers, with outer electrodes having patterned openings and an intermediate pad electrode.

Also, an elastic or flexible, electrically tunable liquid crystal lens is described. The liquid crystal lens includes a cell with a cell gap thickness that is substantially retained after it has been folded and returned to its original shape. Thus, the shape and optical properties of the liquid crystal lens can recover after folding.

Embodiments described include an electroactive cell comprising a liquid crystal in a gap between polymeric alignment layers, with an array of polymer posts disposed in the gap between the alignment layers.

In examples described herein, one or more of the alignment layers comprises a flexible polymeric material including embedded liquid crystal moieties.

Some examples of an electrically tunable lens described herein comprise a first alignment layer and a second alignment layer; an array of elastic polymer posts in a gap between the first alignment layer and the second alignment layer, posts in the array extending from the first alignment layer to the second alignment layer; liquid crystal confined in the gap between the first and second alignment layers around posts in the array; and one or more electrodes arranged to induce an electric field in the liquid crystal.

A polarization-independent example includes a third alignment layer and a second array of elastomer posts in a second gap between the second alignment layer and the third alignment layer, posts in the second array extending from the second alignment layer to the third alignment layer. Also, liquid crystal is confined in the second gap around posts in the second array. The second alignment layer in the example can include liquid crystal moieties having directors aligned orthogonal to an optical path and parallel near a first surface adjacent to the first mentioned gap, and directors aligned orthogonal to an optical path near a second surface adjacent to the second mentioned gap and orthogonal to the directors near the first surface.

Methods for manufacturing flexible liquid crystal cells are described, including formation of polymer posts in liquid crystal layers by photo-polymerization according to a pattern. In an embodiment described herein, the method includes assembling a first flexible alignment layer and a second flexible alignment layer with a gap therebetween; forming flexible or elastic polymer posts extending across the gap between the first flexible alignment layer and the second flexible alignment layer; and providing liquid crystal material surrounding the posts in the gap. In embodiments described herein, the method includes providing a combination of a liquid crystal material and a polymer precursor material in the gap, and forming the elastic posts by inducing phase separation of the polymer precursor and liquid crystal, and polymerizing the polymer precursor according to a pattern.

Various combinations and additions to the devices and methods are described below.

Other aspects and advantages of the present invention can be seen on review of the drawings, the detailed description and the claims, which follow.

DETAILED DESCRIPTION

A detailed description of embodiments of the present invention is provided with reference to the FIGS. 1-22.

Figure 1:
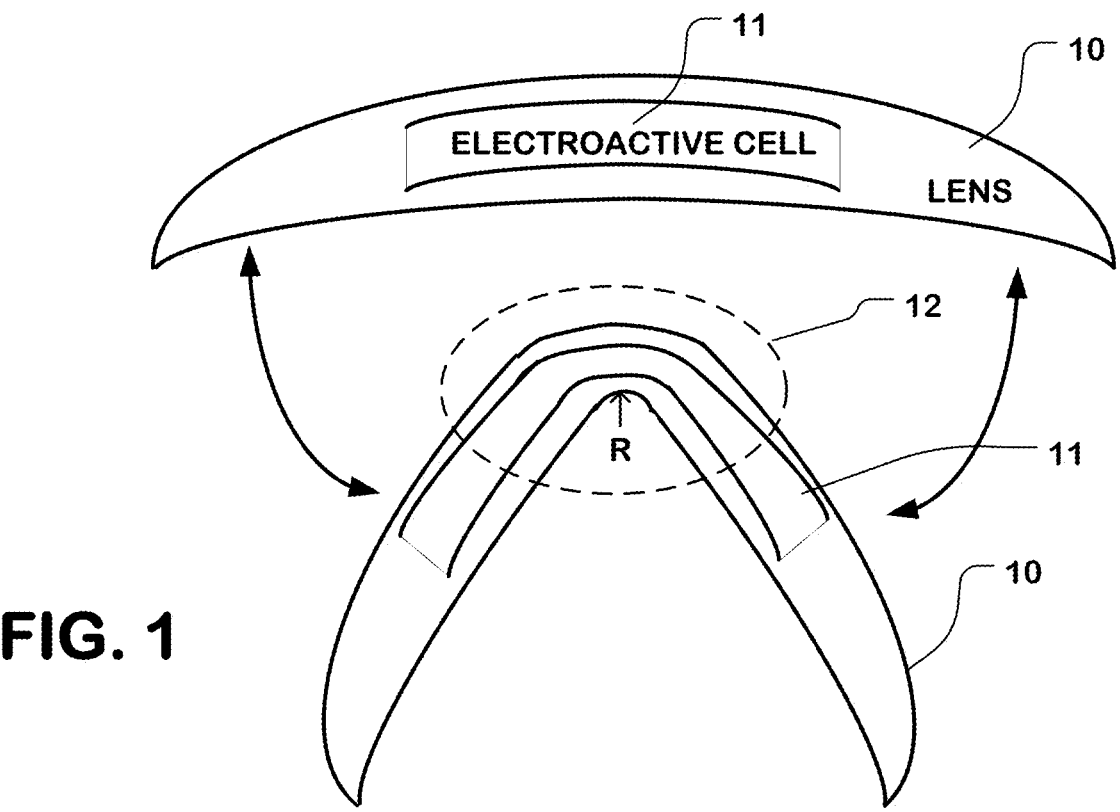
FIG. 1 is a simplified illustration showing folding of a flexible lens with an electroactive cell as described herein.

FIG. 1 illustrates a lens 10 having an electroactive cell 11 embedded therein. The lens 10 is flexible and can comprise a hydrogel material or a silicone hydrogel material for example. The electroactive cell 11 includes electroactive material and at least one electronic component that is used to change the refractive power of the lens. As illustrated in FIG. 1, the lens 10 can be folded when it is made of a flexible material as it is handled by the user. For example, when the lens 10 is a contact lens, then the user may fold the lens when inserting and removing it from the eye. When the lens is folded as illustrated in the lower portion of the Figure, the radius R of the fold can be very small particularly in region 12. For example, a lens can be folded on a fold radius on the order of 1 to 9 mm. When the lens is folded, the electroactive cell 11 can be deformed.

In embodiments described herein, the electroactive cell is elastic in the sense that it recovers its shape and its tunable or adjustable optical characteristics when returned to its original shape, after it is folded.

Figure 2:
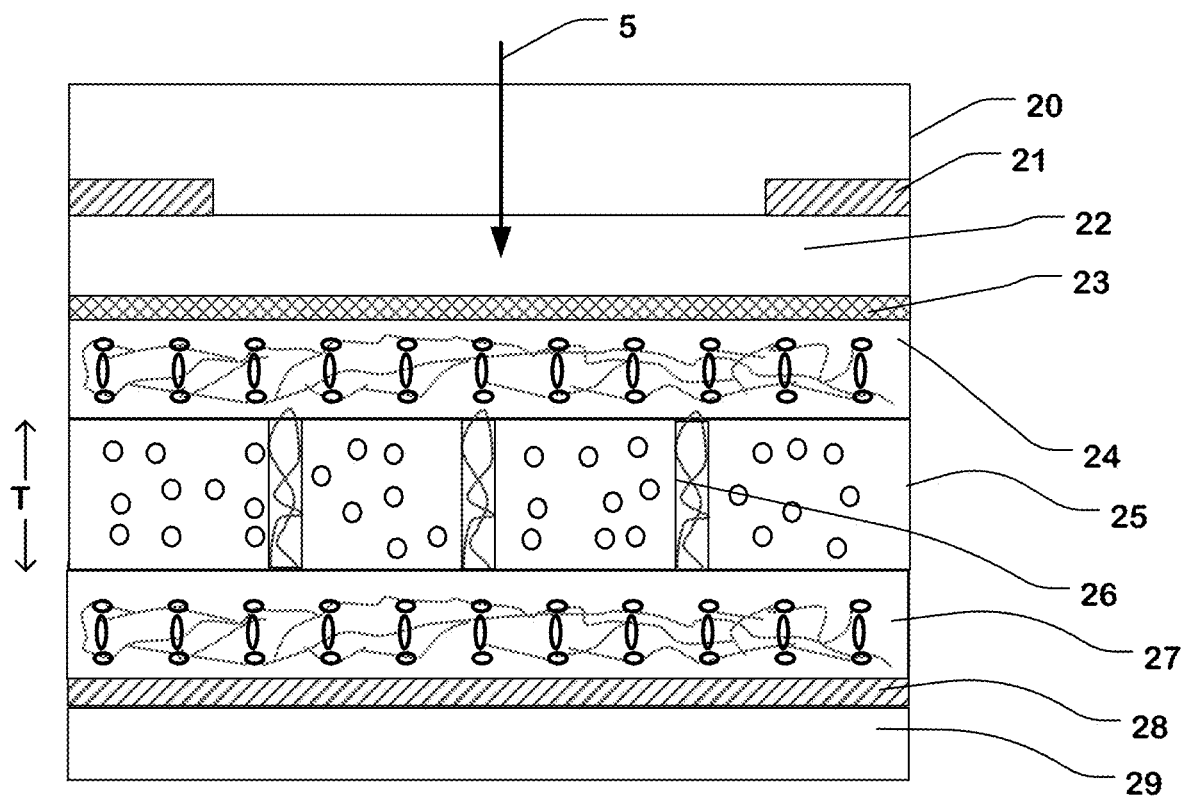
FIG. 2 illustrates a flexible liquid crystal electroactive cell having a single liquid crystal layer.

FIG. 2 illustrates a flexible single layer liquid crystal cell which is elastic in the sense described above. The liquid crystal cell includes a liquid crystal layer 25 (i.e., an active layer comprising liquid crystal) disposed in a gap between an upper (first) polymeric layer 24 and a lower (second) polymeric layer 27, where the polymeric layers 24, 27 comprise a flexible or elastic polymer mixed with liquid crystal moieties configured to act as alignment layers for the liquid crystal layer 25. The polymeric layers 24, 27 have liquid crystal moieties having a vertical director in the central region of the layers, and horizontal directors on the surfaces. In the upper polymeric layer 24 in this example, the directors near the surfaces are orthogonal to the z-axis 5, which can be the optical axis, and horizontal relative to the major surface of the liquid crystal layer 25, extending into and out of the plane of the illustration. In the lower polymeric layer 27 in this example, the directors on the opposing surfaces are horizontal relative to the major surface of the liquid crystal layer 25, extending into and out of the plane of the illustration. The orientations of the directors in this example result in the alignment directions on the upper and lower surfaces of the liquid crystal layer 25 being parallel to one another.

In this example, the liquid crystal layer 25 has a uniform thickness T between the polymeric layers 24, 27, at least across an effective aperture of the liquid crystal cell. For the purposes of this description, a liquid crystal layer has a uniform thickness across an effective aperture of a cell when a user of the cell perceives the optical performance as falling within a range expected for a cell having a nominally uniform thickness, as such a range can occur in a commercial manufacturing setting subject to environmental, manufacturing and material variances.

An array of posts (e.g. post 26) is disposed in the gap between the polymeric layers 24, 27 inside the liquid crystal layer. The posts in the array extend from the upper polymeric layer 24 to the lower polymeric layer 27, and tend to maintain the thickness T. The posts (e.g. 26) can comprise a polymer or polymeric material. Preferably the posts are elastic. Also, preferably, the polymeric layers comprise an elastic polymer or elastomer.

Liquid crystal material is confined in the gap between the first and second polymeric layers around the posts in the array of posts, and acts as the active element of the cell, changing the optical characteristics of the cell in response to an applied electric field.

In this example, electrical components used to apply an electric field in the liquid crystal layer 25 are disposed in a dielectric polymer (including layers 20, 22, 29 in this example). The electrical components include a resistive layer 23, a circular hole patterned electrode layer 21 over the upper polymeric layer 24, and transparent pad electrode layer 28 below the lower polymeric layer 27. In this, and in other embodiments described herein, the patterned electrode layer can have patterns other than a circular hole in some embodiments, including pixelated patterns, and ring-shaped patterns, for more complex control of the shape of the electric field vectors in the liquid crystal layer.

In one representative embodiment, the substrate of the liquid crystal cell includes the dielectric layers 20, 22 comprising polydimethylsiloxane (PDMS) about 17 μm thick each. The dielectric layer 29 likewise comprises PDMS about 17 μm thick or less. The patterned and pad electrode layers 21, 28 can comprise a flexible electrode material about 1 μm thick or less. The liquid crystal layer 25 can be about 30-40 μm thick, such as about 34 μm thick. The upper and lower polymeric layers can be about 6 to 7 μm thick. In this example, the cell has a total thickness of about 98 μm.

In a further embodiment, the substrate of the liquid crystal cell includes the dielectric layers 20, 22 comprising PDMS, each dielectric layer has a thickness from 15 μm to 20 μm. Similarly, the dielectric layer 29 can comprise PDMS and have a thickness from 15 μm to 20 μm. The patterned and pad electrode layers 21, 28 can comprise a flexible electrode material having a thickness from 0.1 μm to 1 μm. The liquid crystal layer 25 can be 25 μm to 45 μm thick. The upper and lower polymer layers can each have a thickness from 5 μm to 10 μm.

In a representative embodiment, the thickness T of the liquid crystal layer 25 is about 34 μm.

In some embodiments, the thickness T is a constant thickness throughout the optical zone of the liquid crystal layer 25, where the optical zone is the effective aperture in which the tunable lens effect is utilized.

A uniform thickness for the cell in this example can be a thickness that varies by less than 1.2 microns from the center of the optic to the edge of the effective aperture. In some embodiments, the variation of thickness T within the effective aperture can be maintained within 0.5 micron.

Embodiments of the liquid crystal cells described herein can maintain optical properties after having been folded over a small radius, and returned to the original shape. For example, in an embodiment comprising a cell gap having an average original thickness T with the liquid crystal layer before folding of about 10 μm, the average thickness T can return to within 10% of its original thickness, or to an average thickness in the range of 9 to 11 μm. In other embodiments, the average thickness T can return to within 2% of its original thickness, or to an average thickness in the range of 9.8 to 10.2 μm. The average thickness of the cell gap or the liquid crystal layer can be determined by measuring the thickness at multiple locations and adding those measurements together and dividing by the number of measurements. The measurements can be taken along a single diameter of the liquid crystal layer (if it has a circular shape), or they can be taken along random points around the liquid crystal layer.

Depending on the requirements of particular implementations, the materials of the flexible dielectric layers 20, 22, 29 acting a substrate for the liquid crystal layer can be chosen from a variety of polymers and elastomers, and combinations thereof, suitable for utilization in a lens, including PDMS-containing materials, PET (polyethylene terephthalate)-containing materials, and hydroxyethyl methacrylate (HEMA)-containing materials.

Depending on the requirements of particular implementations, representative materials usable for the patterned electrode layer 21 and for the transparent pad electrode layer 28 can be poly(3,4-ethylenedioxythiophene) polystyrene sulfonate (PEDOT:PSS), indium tin oxide (ITO), indium zinc oxide (IZO), graphene, silver nanowires and copper metal mesh, and combinations of materials.

A function of resistive layer 23 is to help distribute the electric field into the center of the effective aperture of the lens. The resistive layer 23 has a relatively high resistance relative to the electrodes, and can be referred to as a highly resistive layer. With the resistive layer 23, the operating voltage can be decreased in some examples. The sheet resistance of a resistive layer can be around $10^6 \sim 10^8$ Ω/sq depending on the lens materials and specifications. The resistive layer can be made by mixing PEDOT:PSS solution and PVA (Poly(vinyl alcohol)) solution. The sheet resistance can be controlled for example by the weight ratio between two solutions.

Liquid crystals (LC) are optical anisotropic materials which have a birefringence property. Consider a linear-polarized light which is normally incident to LC optics and the polarization direction and long axis of LC molecules are in the same plane. The light experiences an effective refractive index which is determined by the angle between polarization-direction of light and the director of LC. In addition, the orientation of LC molecules can be controlled by external electric fields. Therefore, a non-uniform electric field on the LC layer with uniform thickness will cause spatial distribution of the orientation of LC molecules. The spatial distribution of the orientation of LC molecules will also form a spatial distribution of effective optical path. By appropriate design, the spatial distribution of effective optical path can realize the lens effect with different lens powers.

LCs can be polarization dependent, which can cost at least 50% of light efficiency when used in combination with a polarizer. To realize polarization-independent LC optics, a pair of LC layers with identical thickness and orthogonally aligned LC directors, as implemented in the examples shown in FIGS. 3A to 3D, can be used. Using the pair of LC layers with orthogonal directors, two Eigen-polarizations of light experience the same phase shift, resulting in a polarization-independent, tunable lens.

FIGS. 3A-3D illustrate alternative embodiments of flexible, two-layer liquid crystal cells which are elastic in the sense described above. These alternative embodiments can be made using materials discussed above with respect to FIG. 2.

Figure 3A:
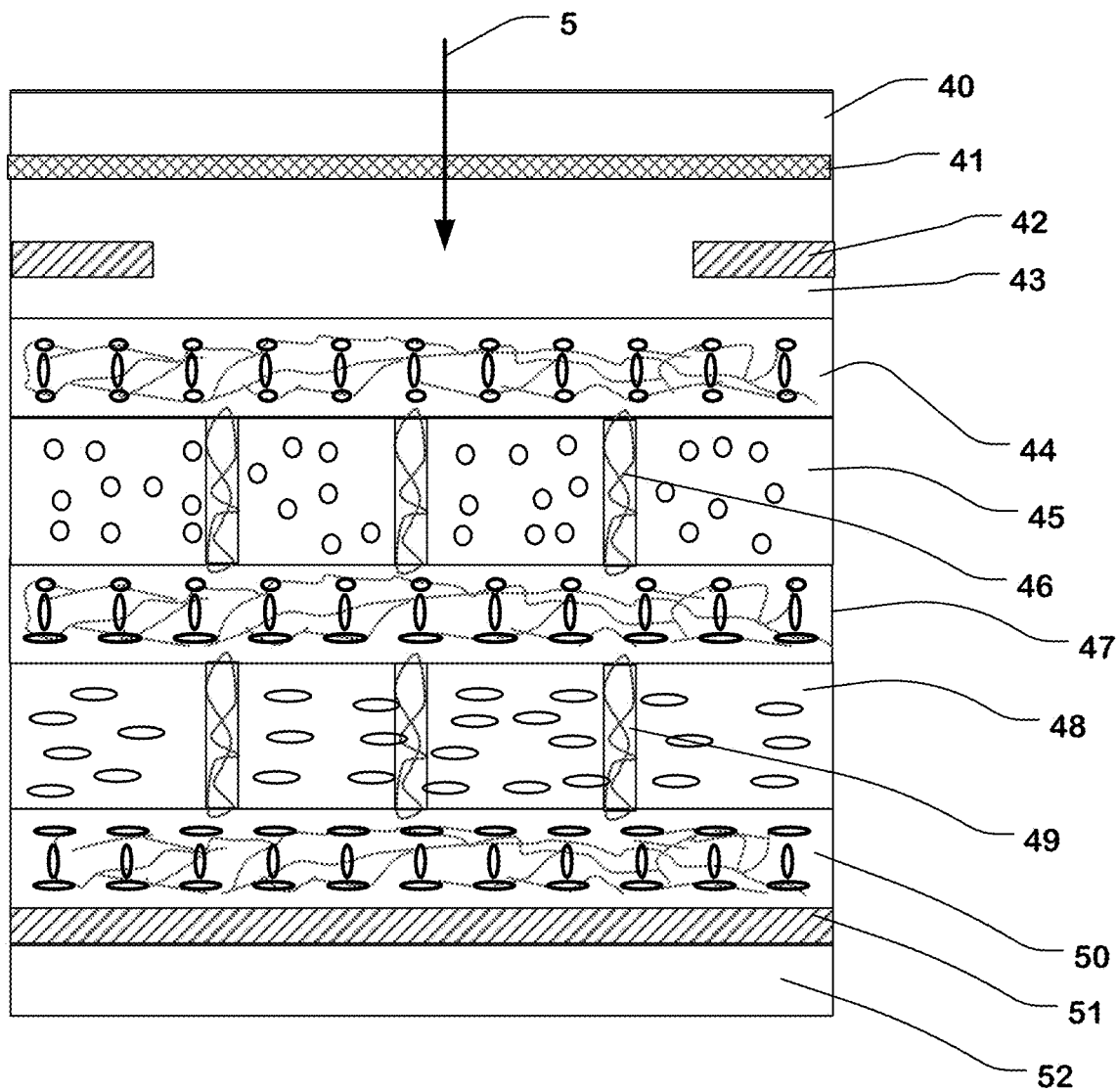
FIGS. 3A, 3B, 3C and 3D illustrate alternative embodiments of a polarization-independent, flexible liquid crystal electroactive cell having two liquid crystal layers.

In FIG. 3A, the cell includes a first liquid crystal layer 45 and a second liquid crystal layer 48. The first liquid crystal layer 45 is disposed in a gap between an upper (first) liquid crystal polymeric layer 44 and an intermediate (second) liquid crystal polymeric layer 47. The second liquid crystal layer 48 is disposed in a gap between the intermediate liquid crystal polymeric layer 47, and a lower (third) liquid crystal polymeric layer 50.

The upper polymeric layer 44 has directors on the lower surface adjacent the liquid crystal layer 45 that are parallel to the surface of the liquid crystal layer 45, and orthogonal to the plane of the illustration. The intermediate polymeric layer 47 has directors on the upper surface adjacent to the liquid crystal layer 45 that are parallel to the surface of liquid crystal layer 45, and orthogonal to the plane of the illustration (i.e., parallel to the directors on the lower surface of the upper polymeric layer 44). The intermediate polymeric layer 47 has directors on the lower surface adjacent to the liquid crystal layer 48 that are parallel to the surface of the liquid crystal layer 48, and parallel to the plane of the illustration (i.e. orthogonal to the directors on the upper surface of the intermediate polymeric layer 47). Lower polymeric layer 50 has directors on its upper surface adjacent to the liquid crystal layer 48 parallel to the surface of the liquid crystal layer 48 and parallel to the plane of the illustration (i.e., parallel to the directors on the lower surface of the intermediate polymeric layer 47).

The polymeric layers 44, 47, 50 act as alignment layers for the liquid crystal layers. The intermediate polymeric layer 47 has orthogonal directors on its upper and lower surfaces. The upper and lower polymeric layers 44, 50 may be replaced in some embodiments by other alignment layer materials, such as a brushed polyimide layer. Utilizing brushed polyimide in the intermediate polymeric layer may not be practical, because of optical losses and other problems. Thus, the alignment technique between the liquid crystal layers in preferred embodiments involves the use of a liquid crystal polymeric layer with orthogonal directors on its upper and lower surfaces.

The liquid crystal layers 45 and 48 comprise liquid crystal material confined in the gap, and have identical thicknesses between the polymeric layers, within reasonable manufacturing and optical performance tolerances.

An array of posts (e.g. 46) is disposed in a gap between the upper polymeric layer 44 and the intermediate polymeric layer 47, and is surrounded by the liquid crystal material in the liquid crystal layer 45. The posts in the array extend from the upper polymeric layer 44 to the intermediate polymeric layer 47, tending to maintain the thickness as discussed above.

A second array of posts (e.g. 49) is disposed in a gap between the intermediate polymeric layer 47 and the lower polymeric layer 50. The second array of posts is surrounded by the liquid crystal material in the liquid crystal layer 48 confined in the gap.

In this example, electrical components are disposed in a dielectric polymer substrate, including layers 40, 43, 52. Electrical components include a resistive layer 41, a patterned electrode layer 42 disposed over the upper polymeric layer 44, and a transparent pad electrode layer 51 below the lower polymeric layer 50.

The liquid crystal cell of FIG. 3A can maintain its optical properties after having been folded over a small radius, and returned to the original shape.

In general, the two-layer liquid crystal cell can provide a positive lens power for unpolarized light, when an electric field is applied through patterned electrodes. The added lens power by the liquid crystal layers is tunable by changing one or more of the amplitude, frequency, duty cycle, DC offset, or pulse shape of the applied electric field.

Figure 3B:
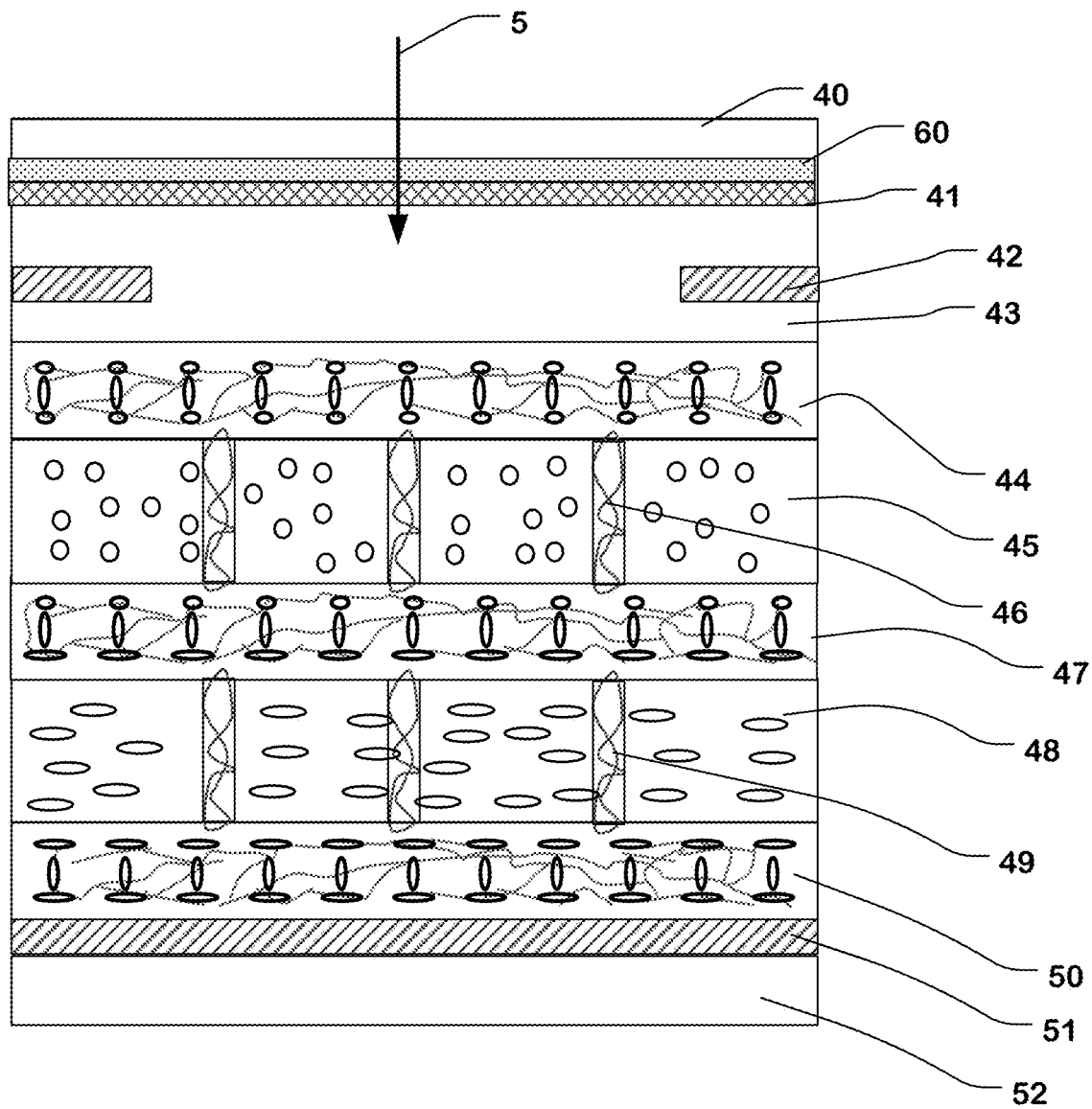
Figure 3C:
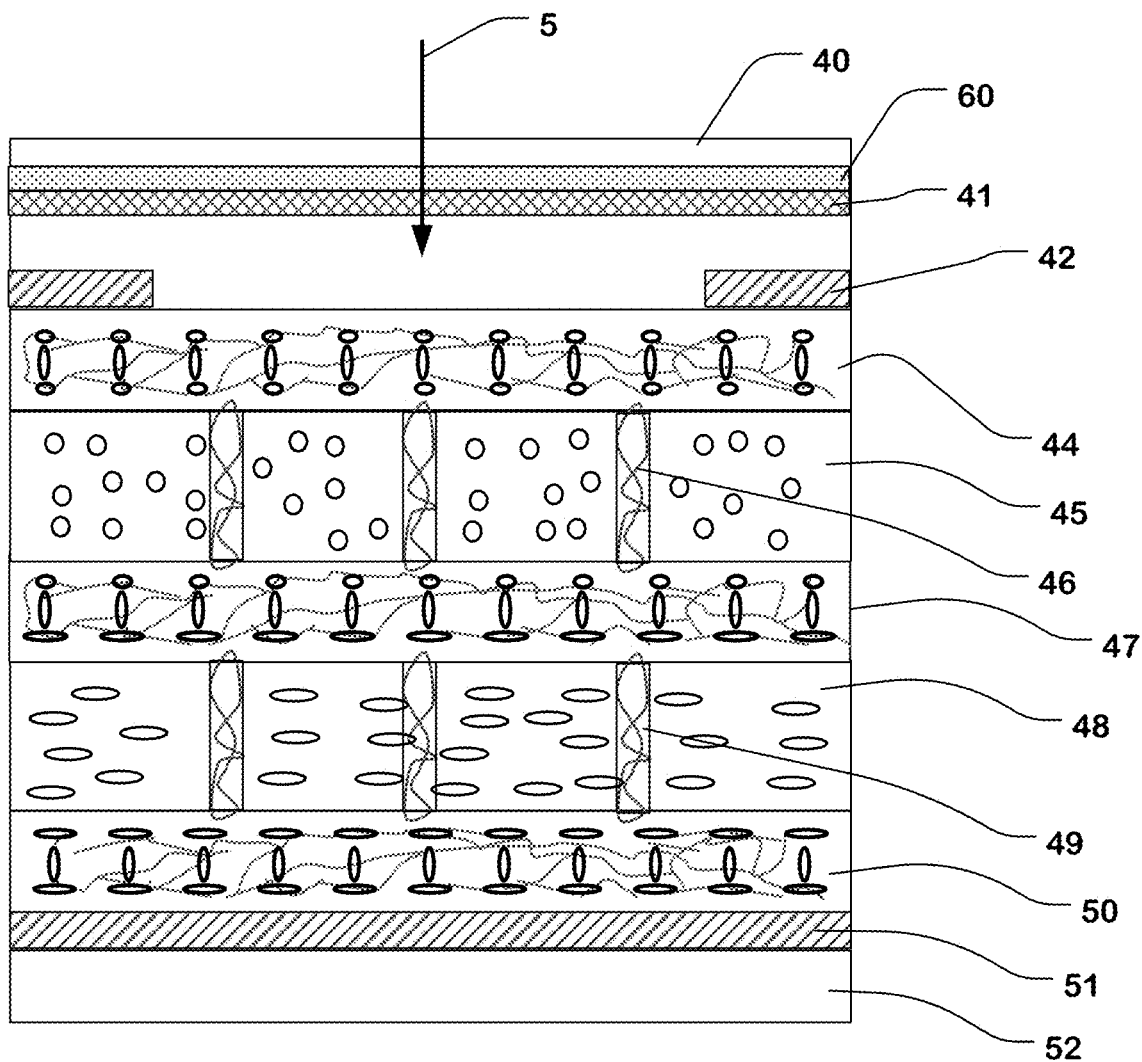
Figure 3D:
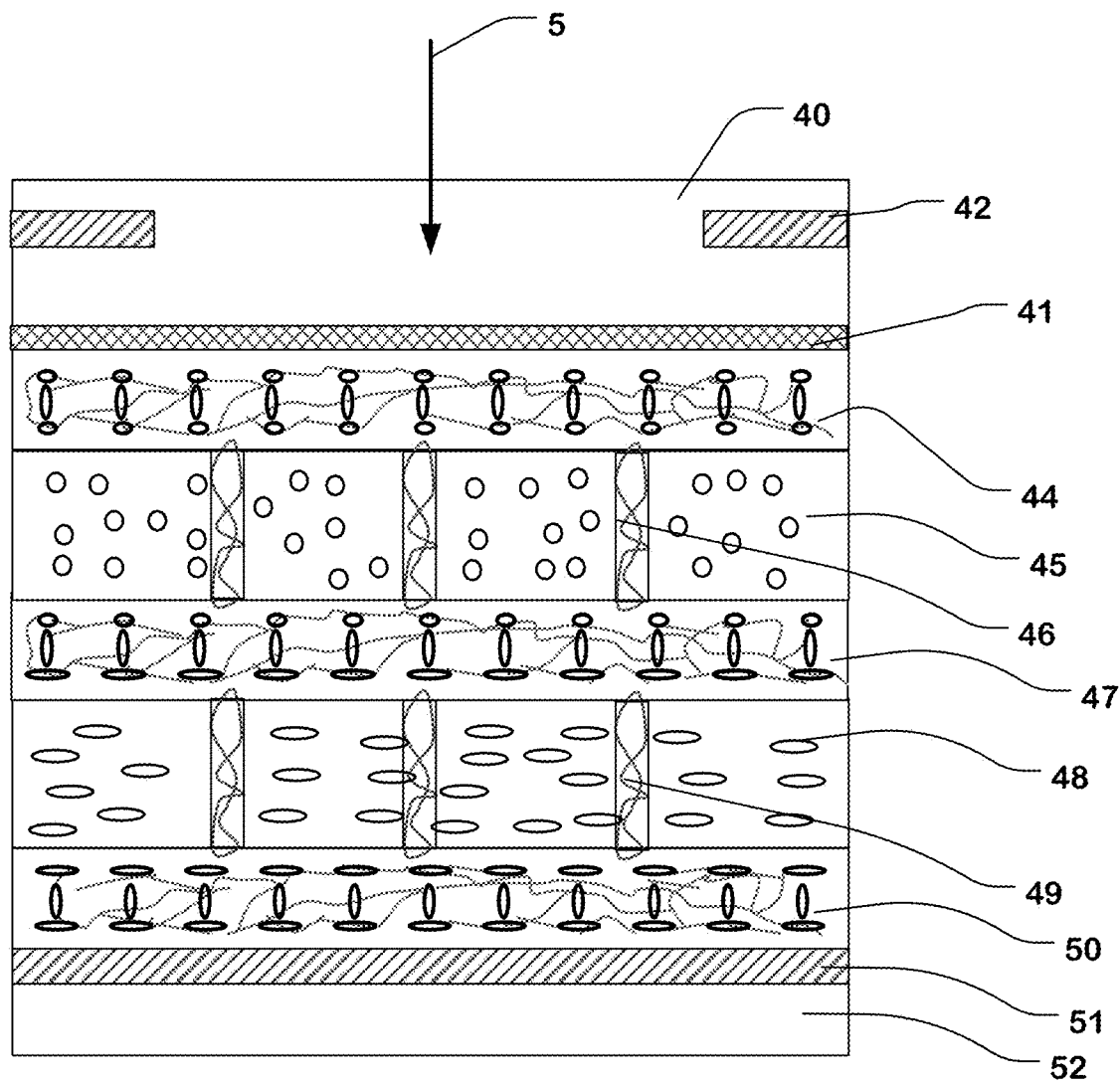

FIGS. 3B through 3D illustrate alternative configurations of two-layer liquid crystal cells like that of FIG. 3A. The same reference numerals are utilized to refer to like components, which are not described again in some instances. The liquid crystal cells of FIGS. 3B-3D can likewise maintain their optical properties after having been folded over a small radius, and returned to the original shape.

As shown in FIG. 3B, in alternative configurations, a polyimide layer can be used with the resistive layer to improve its uniformity. Thus, in FIG. 3B the two-layer liquid crystal cell is modified by adding a polyimide layer 60 in contact with the resistive layer 41.

In FIG. 3C, an embodiment is illustrated in which the two-layer liquid crystal cell is modified by the addition of the polyimide layer 60 in contact with the resistive layer 41, and by moving the upper patterned electrode layer 42 into contact with the upper surface of the upper polymeric layer 44, thereby eliminating the region of layer 43 of the dielectric substrate that is shown in FIGS. 3A and 3B. This has the effect of decreasing the required operating voltage and total thickness of the flexible liquid crystal cell.

In FIG. 3D, an embodiment is illustrated in which the two-layer liquid crystal cell is modified relative to the structure of FIG. 3A, by moving the resistive layer 41 into contact with the upper surface of the upper polymeric layer 44, eliminating much of the region of layer 43 of the dielectric substrate, and eliminating the polyimide layer of FIG. 3B and FIG. 3C. This further reduces the overall thickness of the structure, and eliminates the requirement for the polyimide layer.

An embodiment of a method for manufacturing flexible liquid crystal cell like that of FIG. 2 is illustrated in FIG. 4(a) to FIG. 4(f).

Figure 4A:
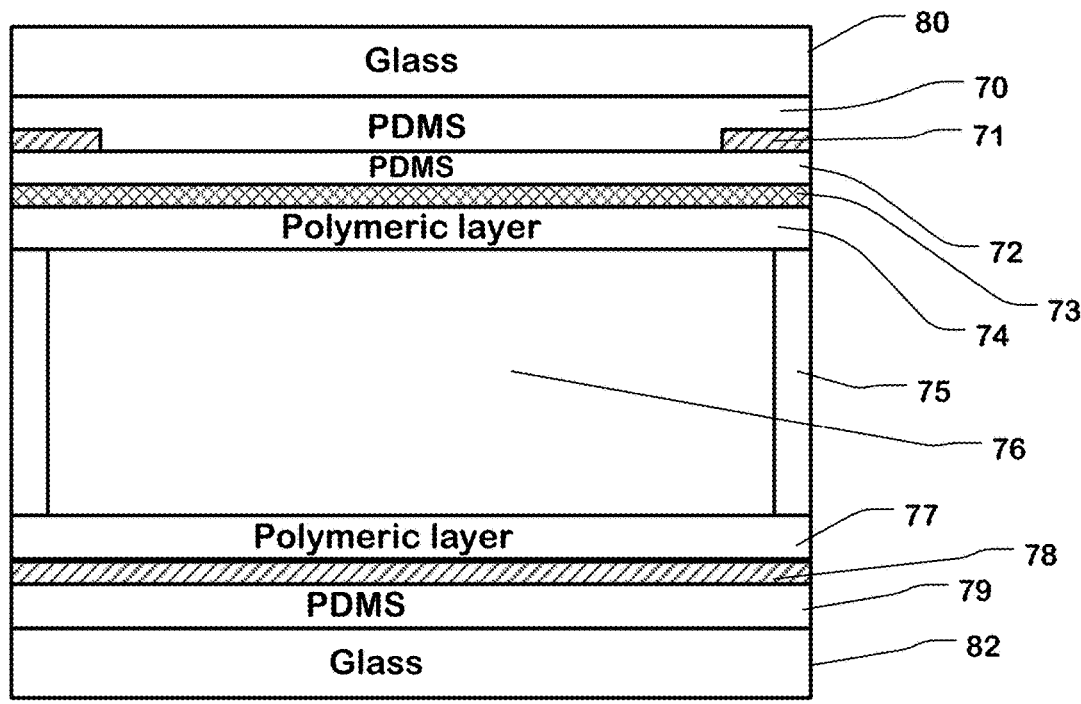
FIGS. 4(a), 4(b), 4(c), 4(d), 4(e) and 4(f) illustrate stages in a manufacturing process for a flexible electroactive cell.

FIG. 4(a) illustrates an empty process cell as a first illustrated stage in the process. The empty process cell consists of upper and lower glass layers 80, 82 which act as cover layers during the forming of the cell. The glass layers are coated with the substrate dielectric material 70, 72, 79, the electrode material 71, 78, the resistive layer 73, and the alignment layers, which in this example are polymeric layers 74, 77 as discussed above. The upper electrode material 71 is patterned to define a hole used to induce a variable electric field as discussed above to provide for a tunable lens power. The lower electrode material 78 is disposed in a pad shape. A Mylar film spacer 75 is disposed between the upper polymeric layer 74 and the lower polymeric layer 77 to define a gap 76 in which the liquid crystal layer and the array of posts is to be formed. In this example, the Mylar film spacer 75 defines a gap thickness of 35 µm.

Figure 4B:
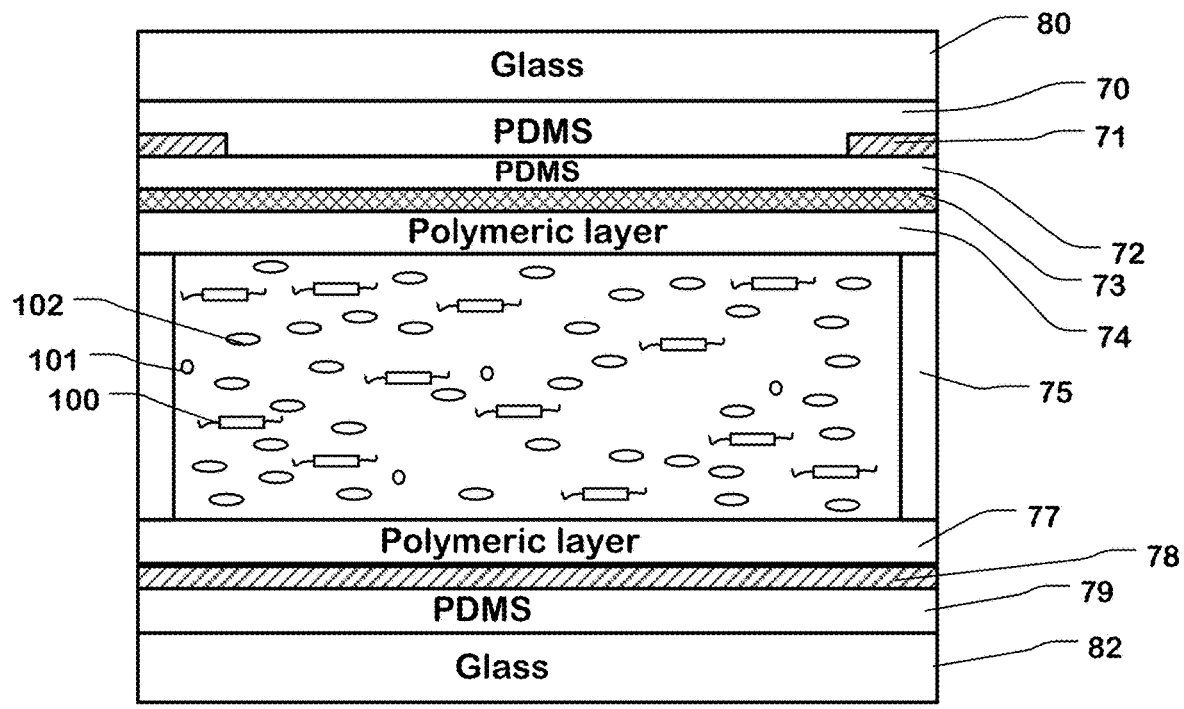

As shown in FIG. 4(b), in a next stage of the manufacturing a combination of the liquid crystal material and polymer precursors is injected into the gap 76, relying on capillary force for example. In some embodiments, the combination includes liquid crystalline monomer moieties 100, a photo-initiator 101, and liquid crystal moieties 102. More specifically in one example process, a combination consists of nematic LC (LCM-1656), liquid crystalline monomer (RM257), and a photo-initiator (IRG184) at ratio of 99 wt %:0.5 wt %: 0.5 wt %. LCM-1656 can be obtained from LC Matter Corp., (e.g., Orlando, Fla., USA; lcmatter-.com), RM-257 and IRG-184 can be obtained from Merck or Merck KgaA (Darmstadt, Germany, merckgroup.com). The materials chosen preferably result in formation of polymer posts having sufficient stiffness to resist severe deformation, but having good elasticity in order to restore the cell gap in the structure after bending.

Figure 4C:
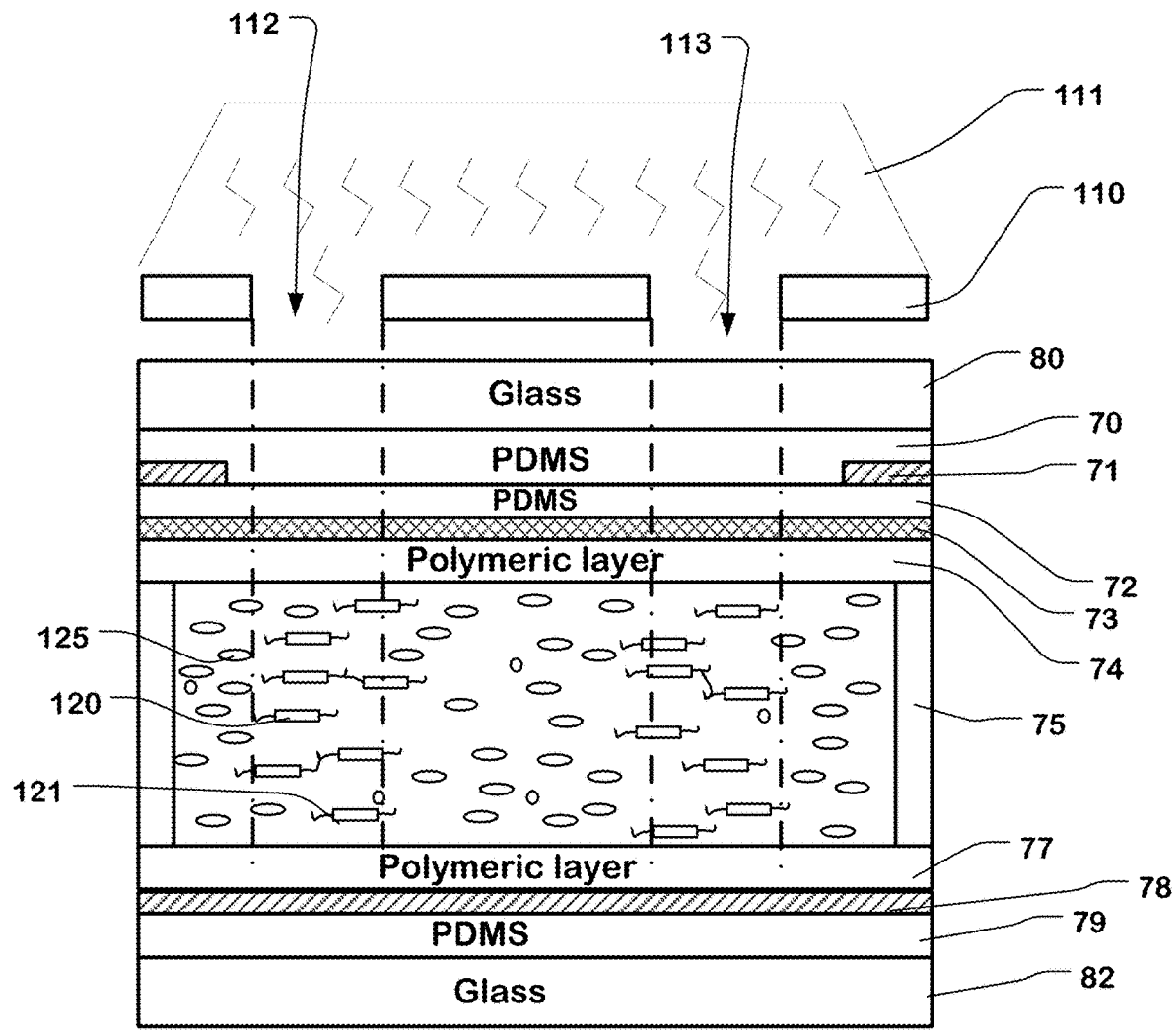

FIG. 4(c) illustrates a next stage in the manufacturing process. The cell, with the combination material injected into the gap 76, is aligned with the lithographic mask 110 that defines an array of holes 112, 113. The structure is then exposed to actinic radiation 111, such as UV radiation in the present example. During the exposure, in a phase separation process the liquid crystal moieties 125 drift away from the regions exposed to the ultraviolet light through the holes 112, 113, while the liquid crystal monomers 120, 121 drift into the region of exposure.

Figure 4D:
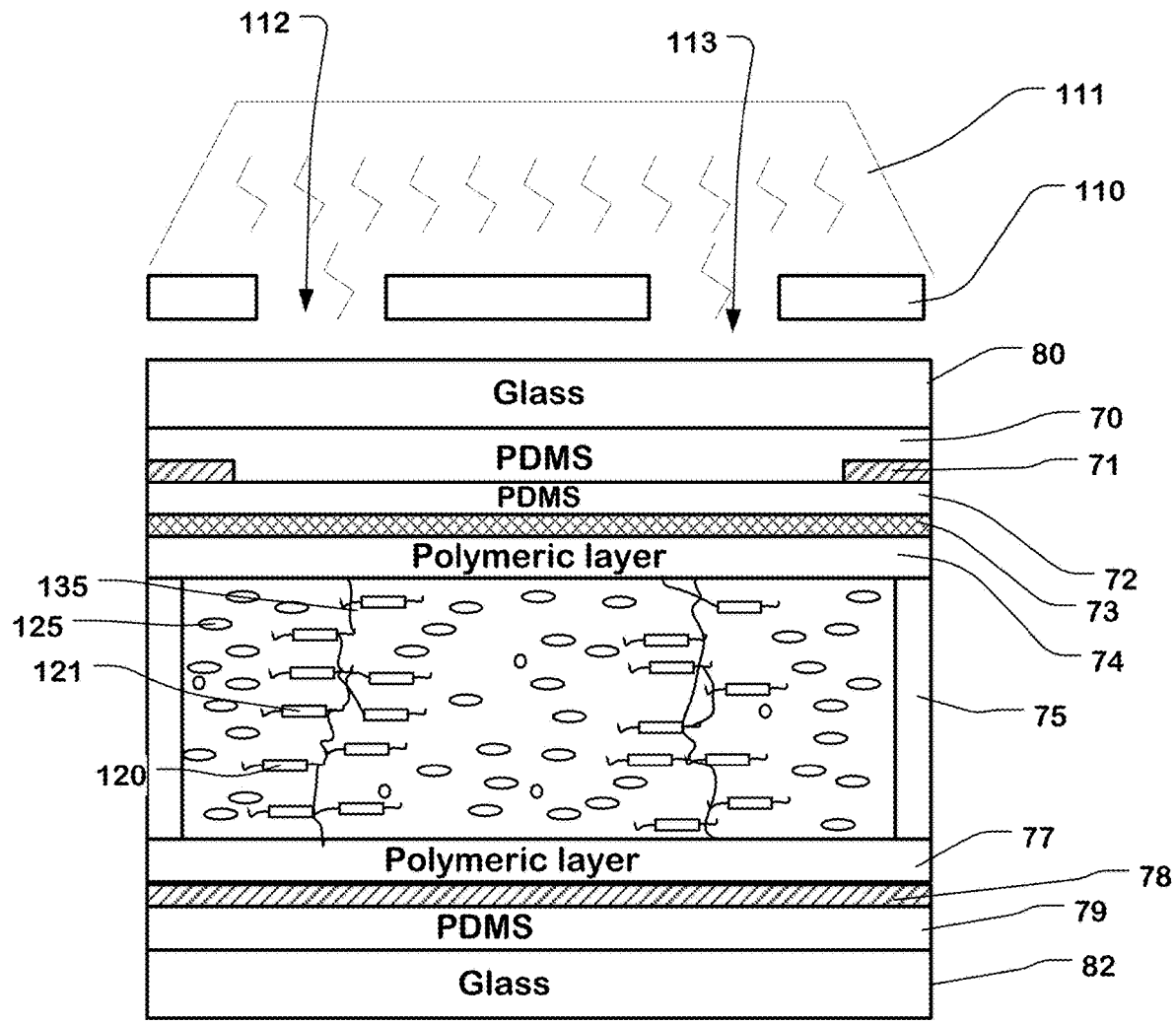

As illustrated in FIG. 4(d), during the exposure to actinic radiation 111, polymer chains 135 form by photo-polymerization among the liquid crystal monomers 120, 121 to form an array of posts extending between the polymeric layers 74, 77.

The exposure to actinic radiation 111 can be carried out at low temperature, below 100° C. and, in the example being described, near room temperature (about 20-25° C.). This low temperature photo-polymerization allows manufacturing without damage to the layers of the structure that are supported by the glass covers during the photo-polymerization process.

Figure 4E:
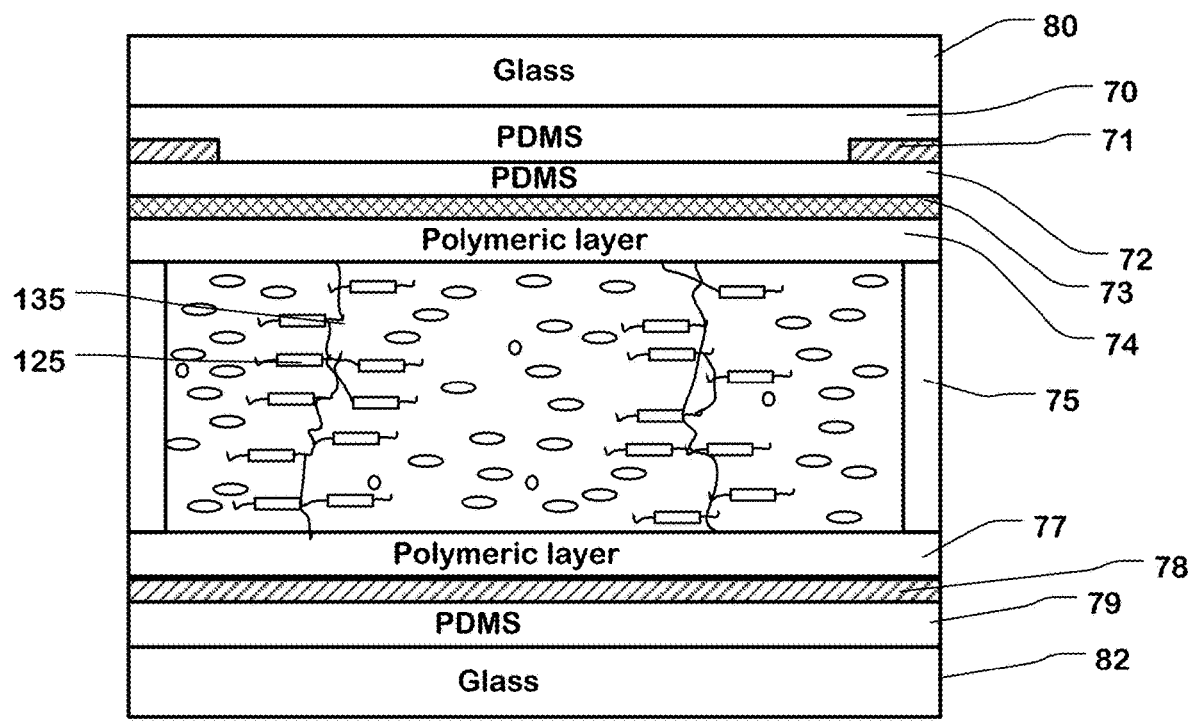

In the next stage, as shown in FIG. 4(e), the cell is removed from the lithographic system, with elastic polymer posts extending from an upper surface of the lower polymeric layer 77 to the lower surface of the upper polymeric layer 74, and with liquid crystal filling the gap and surrounding the posts.

Figure 4F:
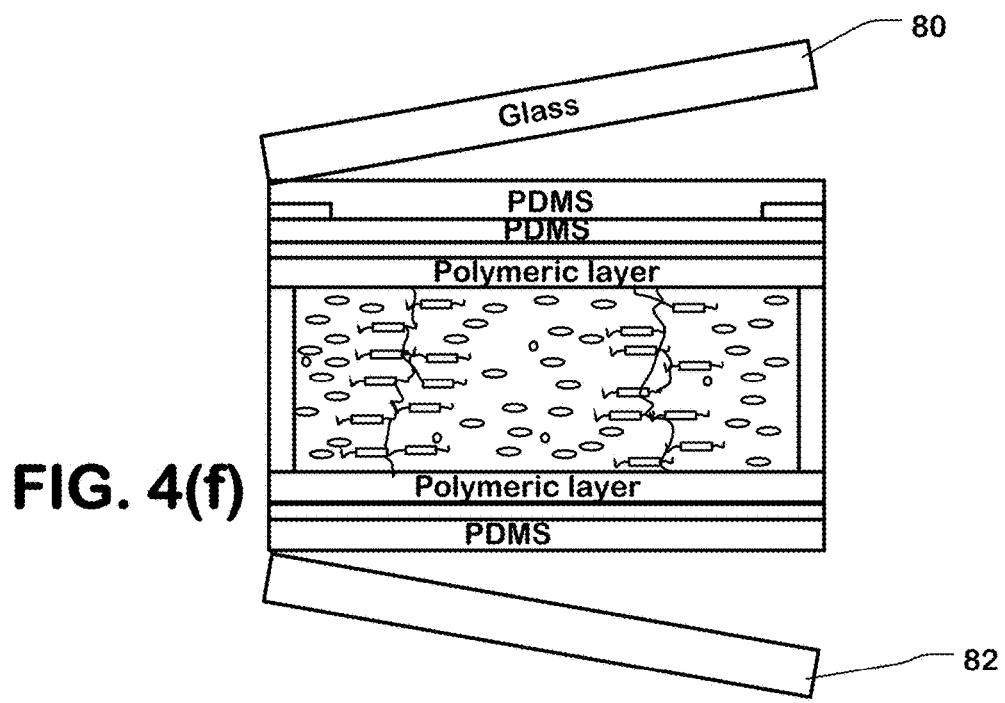

FIG. 4(f) illustrates a following stage, in which the glass layers (covers) 80, 82 are removed, leaving the flexible, tunable liquid crystal cell, such as that shown in FIG. 2.

The liquid crystal cell is sealed by the Mylar spacers in this example using a UV curable polymer. In this example, the posts are formed in a mixture of liquid crystal and monomers during curing by the photo-polymerization. In another embodiment, the posts may be formed in a first step, followed by removal of uncured material leaving a network of posts, and then by injection of liquid crystal after the removal around the network of posts. In some examples, the liquid crystal cell can be sealed during the curing by using the patterned mask to define a sealing region, and closing the cell by the same material as used to make the posts.

This manufacturing process is extendable to the two-layer cell, such as shown in FIGS. 3A-3D, by adding the intermediate polymeric layer, and a second Mylar spacer to define the second gap. Otherwise, similar processing steps are applied for the two-layer cell.

Figure 5:
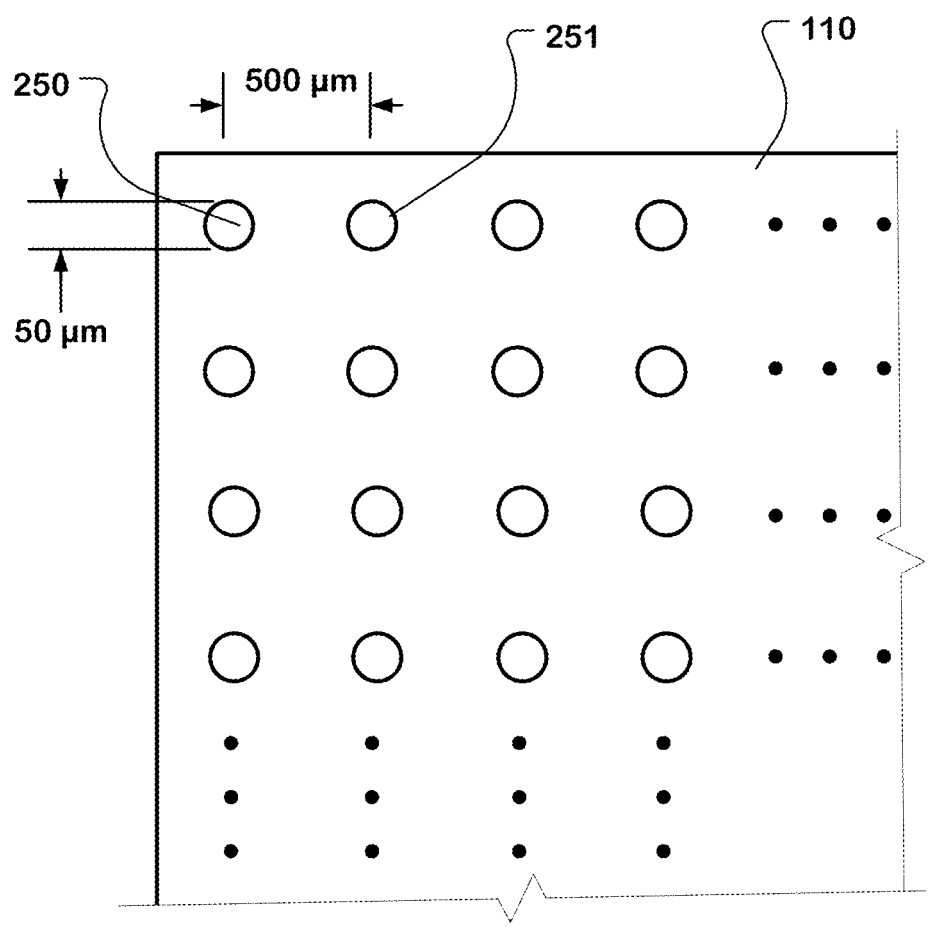
FIG. 5 shows an example layout for a lithographic mask used in processes like that of FIGS. 4(a), 4(b), 4(c), 4(d), 4(e) and 4(f).

FIG. 5 illustrates a representative layout for the lithographic mask 110, which can be used in the stage of the process described with reference to FIG. 4(c) and FIG. 4(d). In this example, the mask layout comprises an array of circular holes 250, 251 having a diameter of about 50 µm, and a pitch of about 500 µm in both the horizontal and vertical dimensions. This layout was selected for a liquid crystal layer about 35 µm thick, using the materials discussed above. Other layouts can be chosen according to the needs of a particular embodiment. The density of the holes translates into a density of posts that are disposed in the gap between the polymeric layers. The density should be selected so as not to interfere significantly with the electro-optic performance of the cell, while maintaining sufficient elasticity in the sense discussed above so that the shape of the cell returns to its original shape, after having been deformed by folding.

The holes need not be circular as illustrated in FIG. 5, but can be elliptical, rectangular, or other more complex shapes. The preferred shape and density of shapes can be determined using empirical methods or simulation.

Figure 6A:
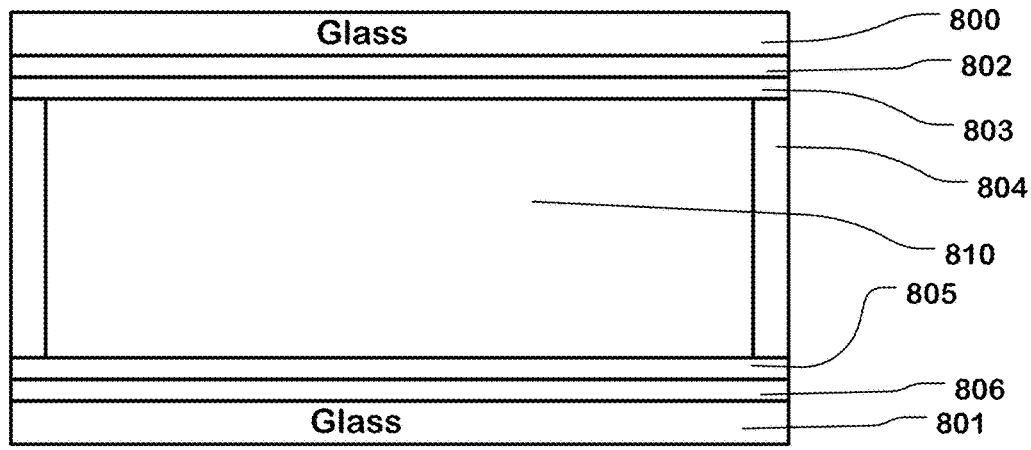
FIGS. 6(a), 6(b), 6(c), 6(d), 6(e) and 6(f) illustrate stages in the manufacturing of a polymeric layer like that used in the structure of FIGS. 2 and 3A, 3B, 3C, and 3D.

FIGS. 6(a) to 6(f) illustrate stages of an embodiment of a method for manufacturing the polymeric layers, which are used as alignment layers in the embodiments discussed above. FIG. 6(a) illustrates a stage of the process including an empty process cell consisting of glass layers 800, 801 coated with respective layers 802, 806 of a conductor such as ITO, and alignment layers 803, 805, such as brushed polyimide, which have been configured to align the directors of the liquid crystal material in the polymeric layer on the opposing surfaces of the polymeric layer according to orientations required for the examples described above. A Mylar spacer 804 maintains a gap 810 between the glass layers 800, 801 with a thickness that can be adjusted depending on the design. For example, the thicknesses of the upper and lower polymeric layers 24, 27 in FIG. 2 are about 7 µm, and the thickness of the polymeric layer 47 in FIGS. 3A-3D is about 35 um.

Figure 6B:
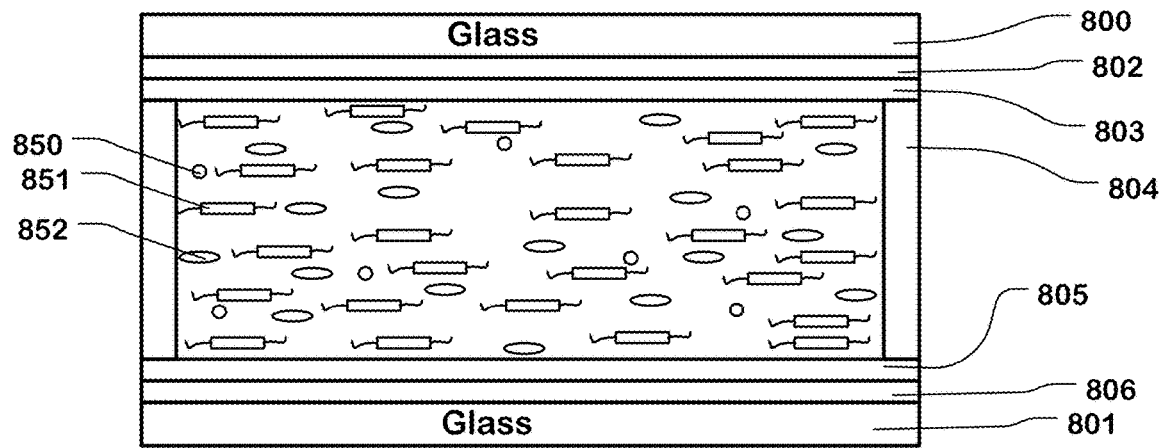

As illustrated in FIG. 6(b), a mixture of a liquid crystal material including moieties 852, a monomer 851 and a photo-initiator 850 is injected into the empty process cell at a temperature of about 90° C. As a result of the alignment layers 803, 806, the monomer, which can be a mesomer having liquid crystal properties, and liquid crystal are aligned in the mixture according to the direction set by the alignment layers 803, 806. In this example, the directors in this liquid phase are aligned in the plane of the illustration, and parallel with the plane of the alignment layers 802, 805.

Figure 6C:
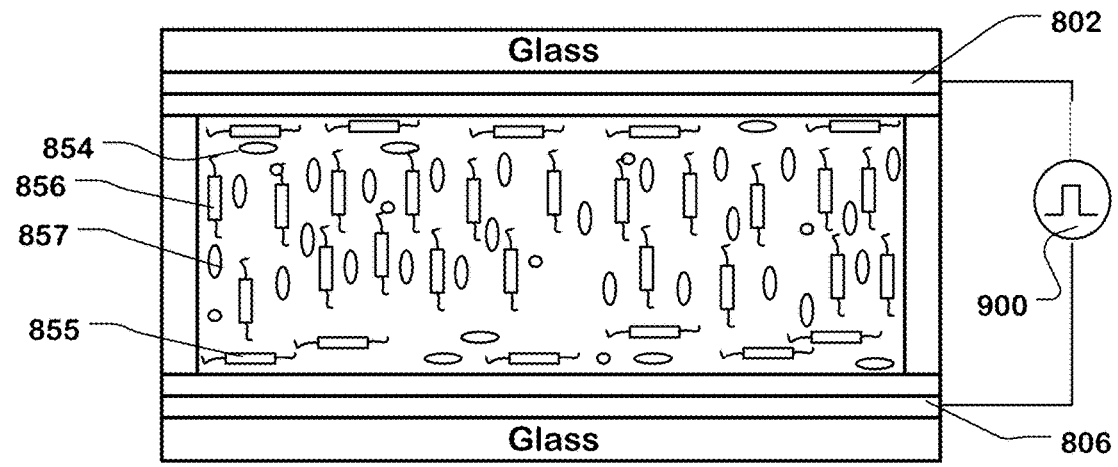
Figure 6D:
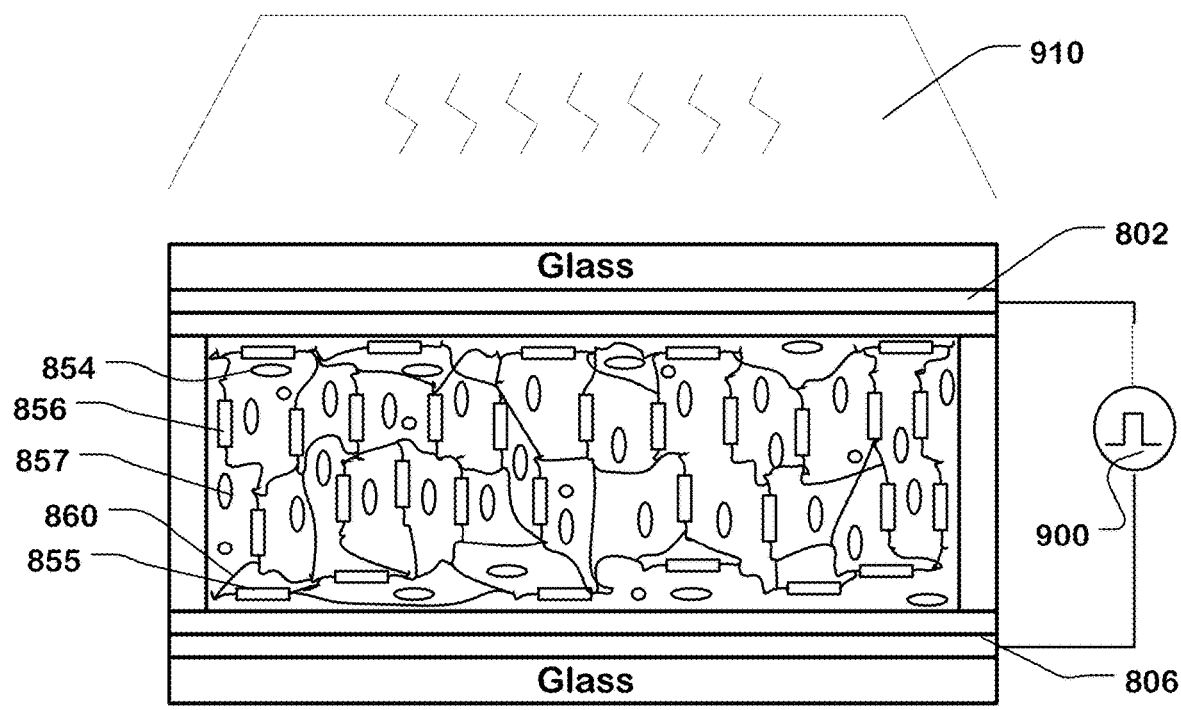
Figure 6E:
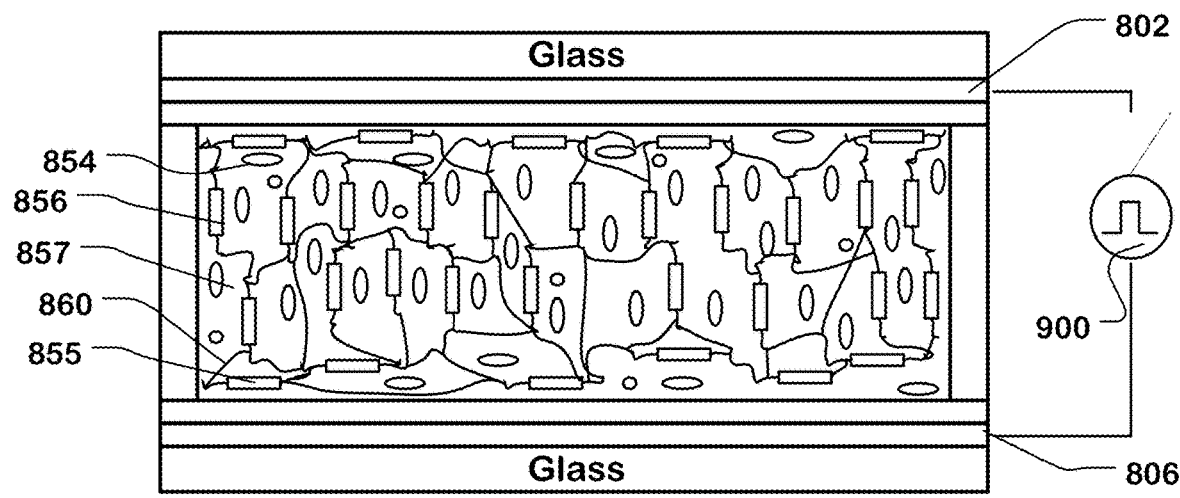
Figure 6F:
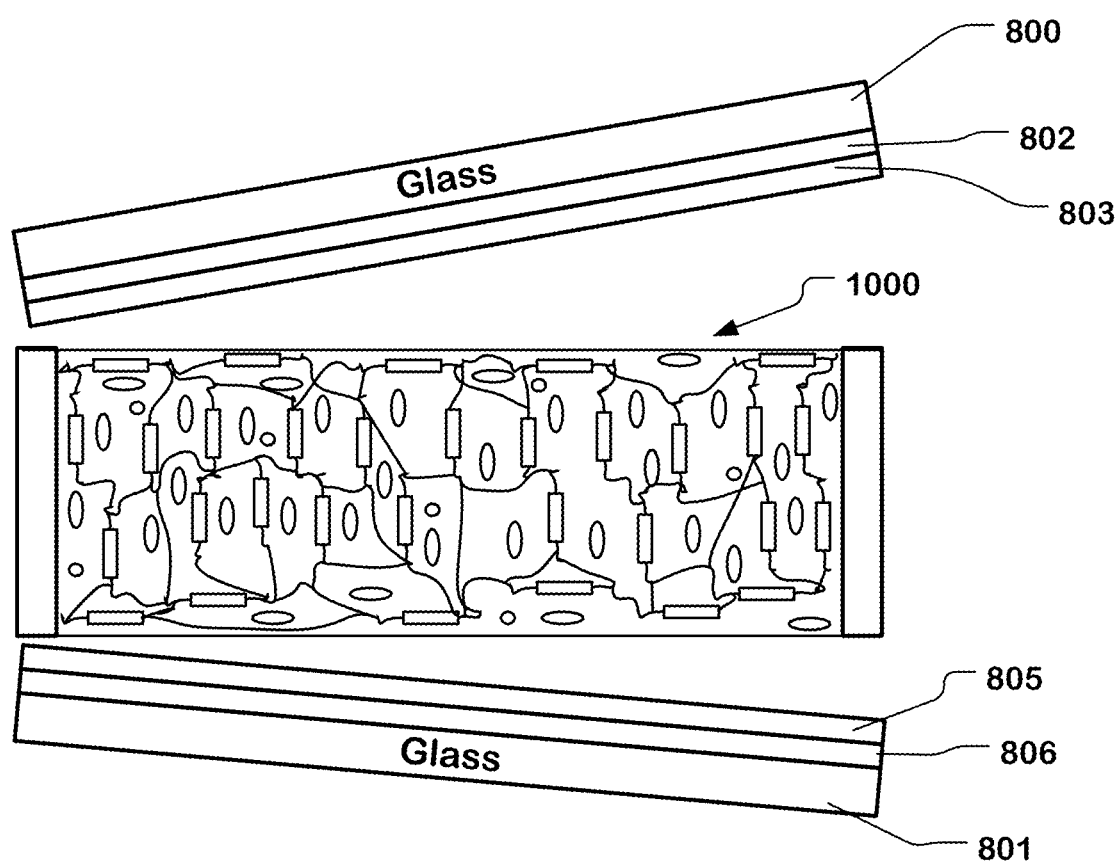

As shown in FIG. 6(c), the conductive ITO layers 802, 806 are connected to a power supply at 900 which applies a high AC voltage which re-orients the molecules of both the monomer (e.g. 856) and the liquid crystal moieties (857) parallel to the z-axis 5 orthogonal to the surfaces of the glass covers. However, due to the strong anchoring force provided by the alignment layers, the molecular orientations (e.g. 854, 855) near the alignment layer surfaces remain parallel to the rubbing directions.

As illustrated in FIG. 6(*d*), the structure is exposed to actinic UV radiation 910 while the AC electric field is applied. This radiation triggers the photo-initiator and activates the photo-polymerization of the monomer. When the monomer reacts to form polymer chains, the polymeric films with embedded liquid crystal moieties results between the two glass covers. A polymer network (e.g. 860) that results from the polymerization traps and helps to maintain the orientation of the liquid crystal molecules in the polymeric layer.

As illustrated in FIG. 6(*e*), after the polymerization is complete, the electric field and UV radiation can be removed. Then, as shown in FIG. 6(*f*), the glass covers 802, 801, along with the ITO and alignment layers (802, 803 and 805, 806) are peeled off of the polymeric layer 1000.

As a result, the polymeric layer in this example can be optically anisotropic since the directors of the liquid crystal moieties through the majority of the polymeric layer in the center away from the surfaces in contact with the alignment layers lie on the z-axis. The liquid crystal molecules on the surface of the polymeric layers remain disposed parallel to the surfaces of the alignment layer and confined by the polymer networks. Thus the surface of the polymeric layer can be used to align liquid crystal molecules in the liquid crystal layer in the structures described above.

This process can be used to set different orientations of the liquid crystal molecules on the surface of the polymeric layers, by changing the rubbing directions and materials of the alignment layers 803, 805 during fabrication. Also, by applying variable electric fields during polymerization, the alignment direction throughout the polymeric layer can be caused to tilt, resulting in a passive lens effect.

In one specific example, the polymeric layer consists of reactive mesogen (RM257), liquid crystal (MLC2144) and the photo-initiator (IRG184) with the ratio of RM257:MLC2144:IRG184=79 wt %:20 wt %: 1 wt %. RM257 is 1,4-Bis-[4-(3-acryloyloxypropyloxy)benzoyloxy]-2-methylbenzene with the CAS 174063-87-7. IRG184 is 1-Hydroxycyclohexyl phenyl ketone with the CAS 947-19-3.

In one embodiment, the reactive monomer used for the purposes of forming the posts as discussed with reference to FIGS. 4(*a*) to 4(*f*) can be the same (e.g. RM257) as used as a reactive monomer in the formation of the polymeric layers. In other embodiments, the polymer precursors can be different in the two procedures. Also, different polymer precursors and liquid crystal materials can be used for different polymeric layers in some embodiments.

The materials for fabricating polymeric layers are not limited to RM257, IRG184 and MLC2144. Alternative materials can include other liquid crystalline monomers and photo-initiators. Also, the liquid crystal (MLC2144) could be replaced by other nematic liquid crystals.

To form polymeric alignment layers having an anchoring strength greater than $10^{-4}$ J/m$^2$, the ordering of the polymer network on the surfaces of the polymeric alignment layers should be strong. In one technique to achieve this strong ordering of the polymer network, the alignment layers 803, 805 utilized in the process of FIGS. 6(*a*) to 6(*f*) are alignment layers with strong anchoring strength, such as Polyimide AL 22620 or Polyimide SE 7492. Other techniques for achieving strong ordering on the surfaces of the polymeric alignment layers can be utilized.

Figure 7:
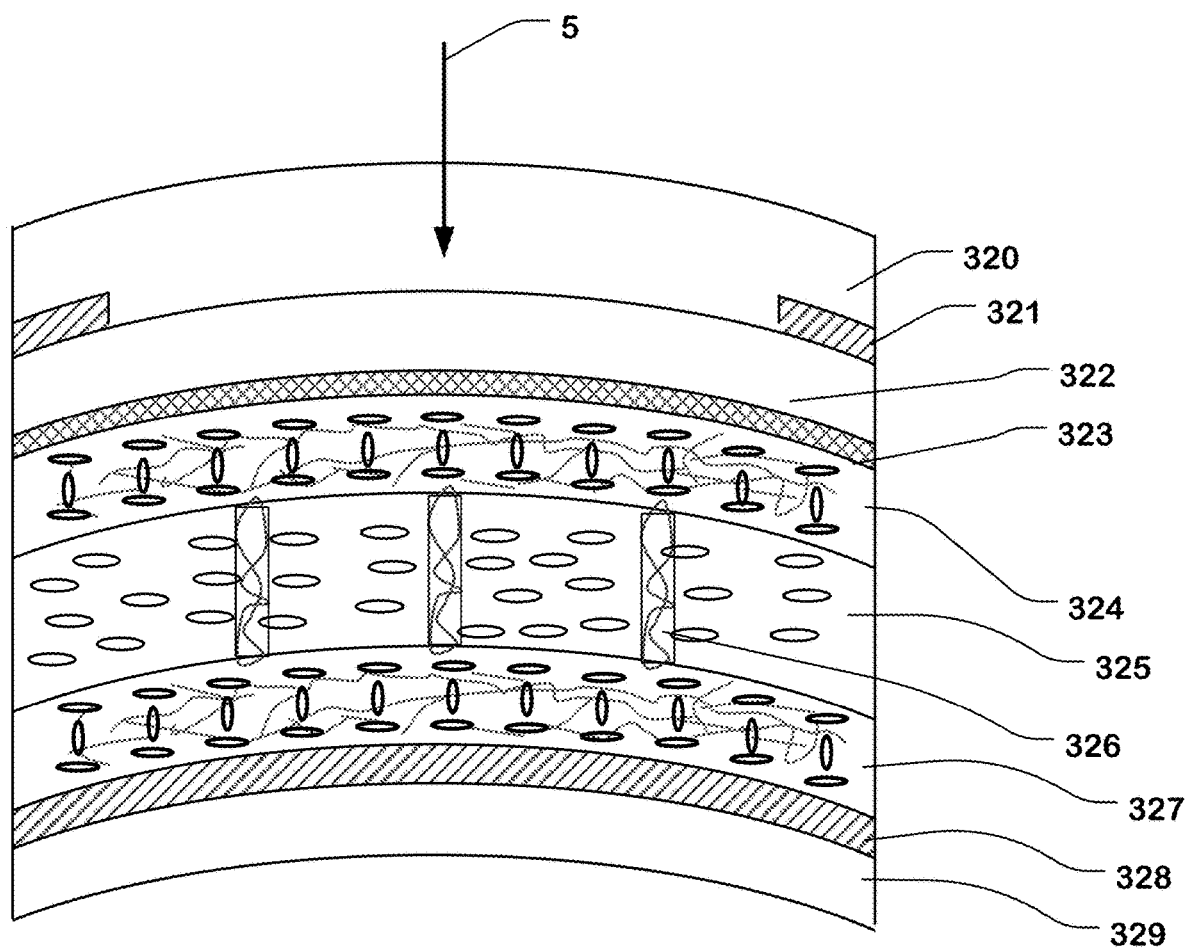
FIG. 7 illustrates an example of a curved, flexible liquid crystal electroactive cell.

FIG. 7 illustrates a flexible single-layer liquid crystal cell formed on a curved substrate. This structure can be made using the process described above, for example, with glass covers in the process cell having curved surfaces. The liquid crystal cell includes a liquid crystal layer 325 disposed in a gap between polymeric layer 324 and polymeric layer 327, where the polymeric layers 324 and 327 comprise flexible or elastic polymer mixed with liquid crystal moieties configured to act as alignment layers for the liquid crystal layer 325. The polymeric layers 324, 327 have liquid crystal moieties having a vertical director in the central region of the layers, and horizontal directors on the surfaces. In the upper polymeric layer 324 in this example, the directors on the surfaces are horizontal relative to the major surface of the liquid crystal layer 325, and parallel to the plane of the illustration. In the lower polymeric layer 327 in this example, the directors on the upper surface are horizontal relative to the major surface of the liquid crystal layer 325, and parallel to the plane of the illustration. On the lower surface of the lower polymeric layers 327, the directors are parallel to those on the upper surface. The orientations of the directors in this example result in the alignment directions on the upper and lower surfaces of the liquid crystal layer 25 parallel to one another.

An array of posts (e.g. post 326) is disposed in the liquid crystal layer 325. The posts in the array extend from the upper polymeric layer 324 to the lower polymeric layer 327, and tend to maintain the thickness of the liquid crystal layer 325.

Preferably the posts and the polymeric layers comprise an elastic polymer or elastomer.

The liquid crystal is confined in the gap between the first and second polymeric layers around the posts in the array of posts.

In this example, electrical components are disposed in a dielectric polymer (including layers 320, 322, 329 in this example). The electrical components include a resistive layer 323, a patterned electrode layer 321 over the upper polymeric layer 324, and pad electrode layer 328 below the lower polymeric layer 327.

In one representative embodiment, the substrate of the liquid crystal cell includes the dielectric layers 20, 22 comprising PDMS.

The radius of curvature of the cell can range in various embodiments from about 100 mm to 8 mm or less. For example, the radius of curvature can range from 100 mm to 1 mm.

Embodiments of the liquid crystal cell shown in FIG. 7 can maintain optical properties after having been folded over a small radius, and returned to the original shape.

Figure 8:
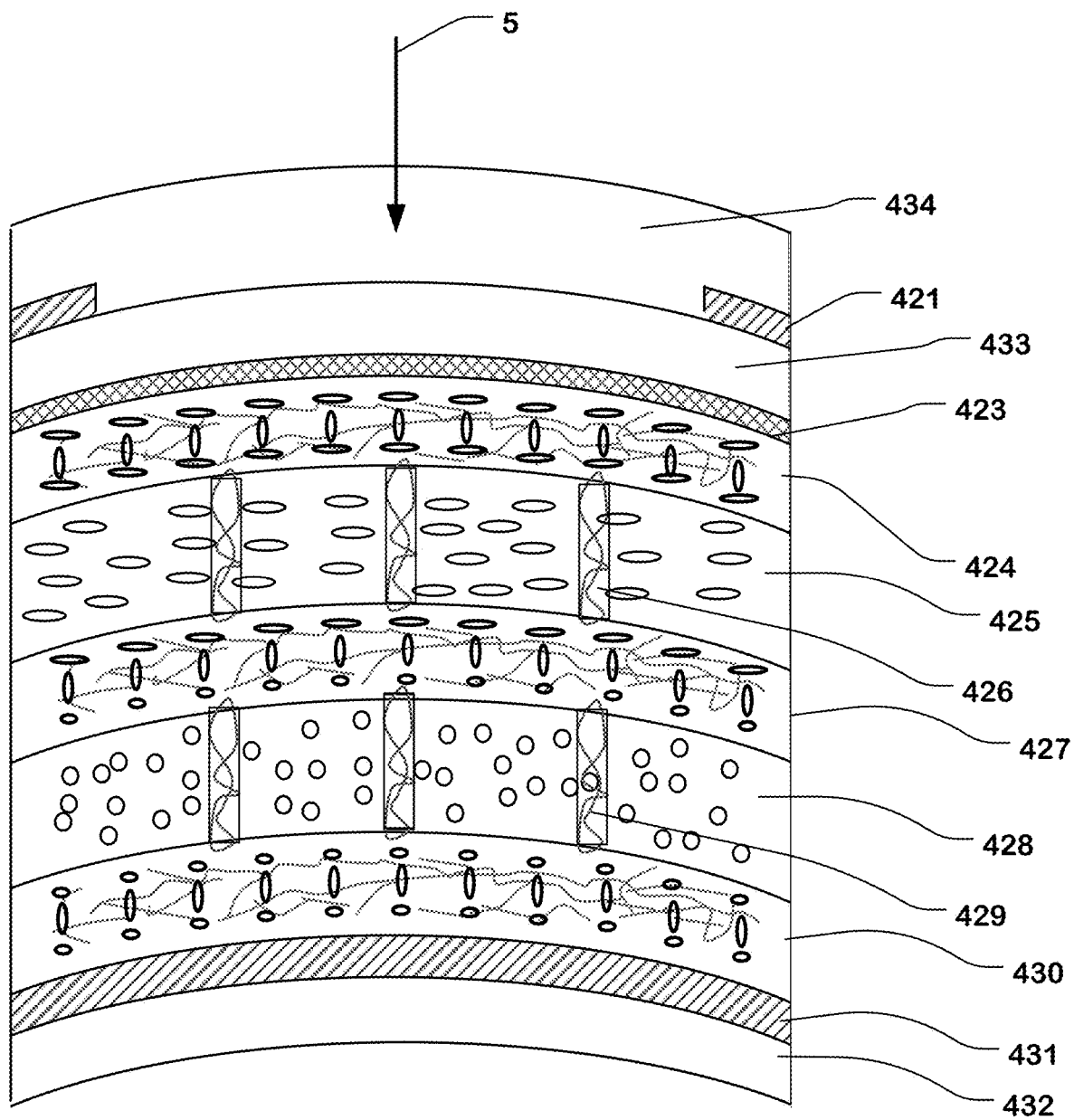
FIG. 8 illustrates an example of a curved, flexible liquid crystal electroactive cell having two layers of liquid crystal.

FIG. 8 illustrates a flexible two-layer liquid crystal cell formed on a curved substrate. In FIG. 8, the cell includes a first liquid crystal layer 425 and a second liquid crystal layer 428. The first liquid crystal layer 425 is disposed in a gap between an upper (first) liquid crystal polymeric layer 424 and an intermediate (second) liquid crystal polymeric layer 427. The second liquid crystal layer 428 is disposed in a gap between the intermediate liquid crystal polymeric layer 427, and a lower (third) liquid crystal polymeric layer 430.

The upper polymeric layer 424 has directors on the lower surface adjacent the liquid crystal layer 425 that are orthogonal to the z-axis 5 of the cell, and parallel to the plane of the illustration. The intermediate polymeric layer 427 has directors on the upper surface adjacent to the liquid crystal layer 425 that are orthogonal to the z-axis 5, and parallel to the plane of the illustration (i.e. parallel to the directors on the lower surface of the upper polymeric layer 424). The intermediate polymeric layer 427 has directors on the lower surface adjacent to the liquid crystal layer 428 that are orthogonal to the z-axis 5, and orthogonal to the plane of the illustration (i.e. orthogonal to the directors on the upper surface of the intermediate polymeric layer 427). Lower polymeric layer 430 has directors on its upper surface adjacent to the liquid crystal layer 428 orthogonal to the z-axis 5 and orthogonal to the plane of the illustration (i.e. parallel to the directors on the lower surface of the intermediate polymeric layer 427).

The polymeric layers 424, 427, 430 act as alignment layers for the liquid crystal layers. The intermediate polymeric layer 427 has orthogonal directors on its upper and lower surfaces. The upper and lower polymeric layers 424, 430 may be replaced in some embodiments by other alignment layer materials, such as a brushed polyimide layer.

An array of posts (e.g. 426) is disposed in a gap between the upper polymeric layer 424 and the intermediate polymeric layer 427, and is surrounded by the liquid crystal material in the liquid crystal layer 425 confined in the gap. The posts in the array extend from the upper polymeric layer 424 to the intermediate polymeric layer 427, tending to maintain the thickness as discussed above.

A second array of posts (e.g. 429) is disposed in a gap between the intermediate polymeric layer 427 and the lower polymeric layer 430. The second array of posts is surrounded by the liquid crystal material in the liquid crystal layer 428 confined in the gap.

In this example, electrical components are disposed in a dielectric polymer substrate, including layers 432, 433, 434. Electrical components include a resistive layer 423, a patterned electrode 421 disposed over the upper polymeric layer 424, and a pad electrode layer 431 below the lower polymeric layer 430.

The curved embodiments of FIGS. 7 and 8 can provide passive, additive lens power to the electroactive component of the cell.

Embodiments of the liquid crystal cells shown in FIGS. 7 and 8 can maintain optical properties after having been folded over a small radius, and returned to the original shape.

Figure 9:
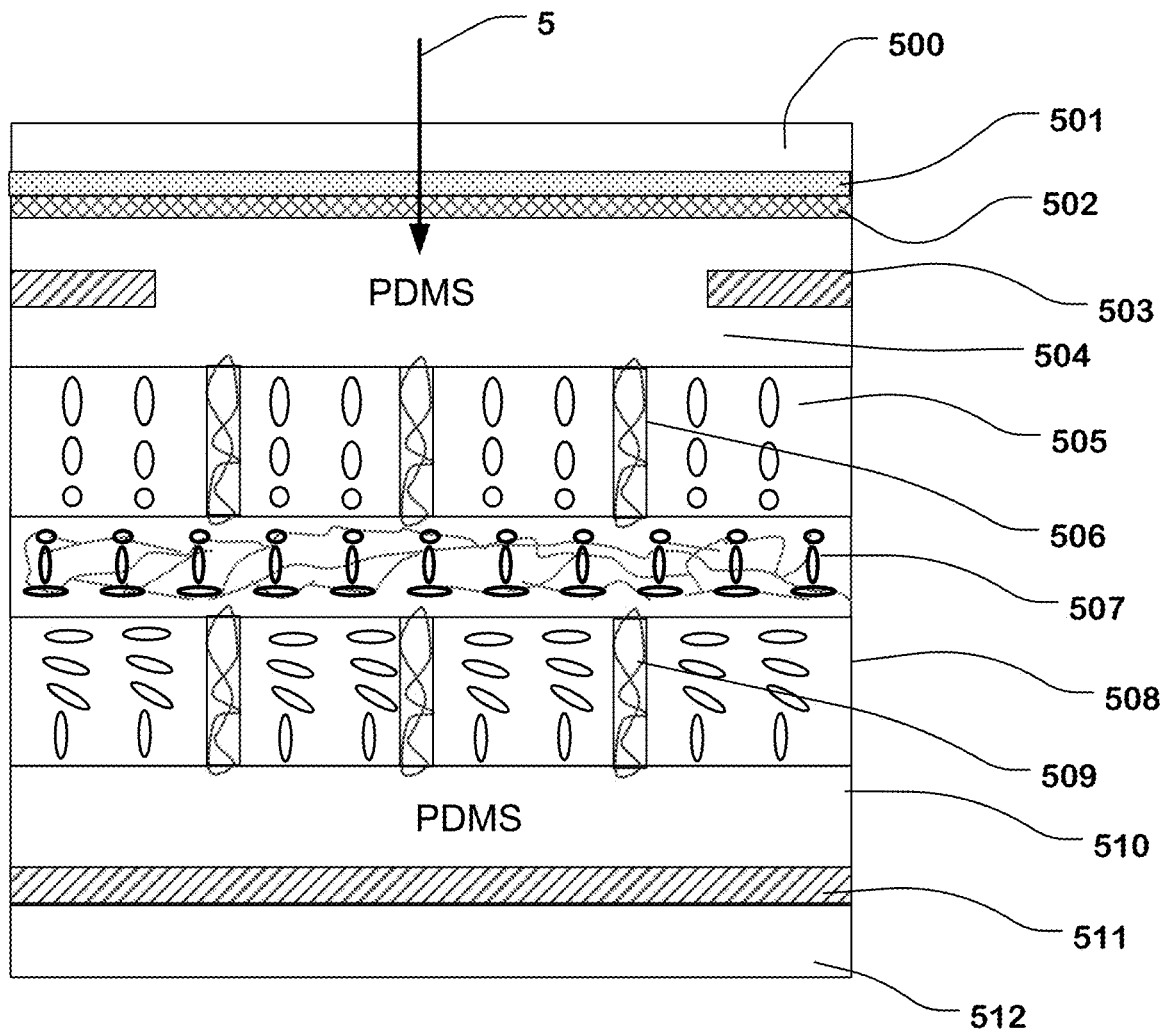
FIG. 9 illustrates an example of a two-layer liquid crystal cell, having hybrid alignment in the liquid crystal layers.

FIG. 9 illustrates another embodiment of a two-layer liquid crystal cell utilizing hybrid alignment of the liquid crystal molecules in the liquid crystal layers. The cell includes a first liquid crystal layer 505 and a second liquid crystal layer 508. The first liquid crystal layer 505 is disposed in a gap between an upper vertical alignment layer 504, which can comprise PDMS for example, and an intermediate polymeric layer 507. The second liquid crystal layer 508 is disposed in a gap between the intermediate polymeric layer 507, and a lower vertical alignment layer 510.

The intermediate polymeric layer 507 has directors on the upper surface adjacent to the liquid crystal layer 505 that are orthogonal to the z-axis 5 (parallel to the surface of liquid crystal layer 505), and orthogonal to the plane of the illustration. The intermediate polymeric layer 507 has directors on the lower surface adjacent to the liquid crystal layer 508 that are orthogonal to the z-axis 5, and parallel to the plane of the illustration (i.e. orthogonal to the directors on the upper surface of the intermediate polymeric layer 507).

The directors in the liquid crystal layers 505, 508 adjacent to the upper vertical alignment layer 504 and the lower vertical alignment layer 510 are arranged vertically, parallel to the z-axis 5, in the plane of the illustration. The directors in the liquid crystal layers twist between the upper and lower surfaces of liquid crystal layers 505, 508 as illustrated, in orthogonal planes because of the alignment function of the intermediate polymeric layer 507.

The liquid crystal layers 505 and 508 have identical thickness between the polymeric layers, within reasonable manufacturing and optical performance tolerances.

An array of posts (e.g. 506) is disposed in a gap between the upper alignment layer 504 and the intermediate polymeric layer 507, and is surrounded by the liquid crystal material in the liquid crystal layer 505 confined in the gap. The posts in the array extend from the upper alignment layer 504 to the intermediate polymeric layer 507, tending to maintain the thickness as discussed above.

A second array of posts (e.g. 509) is disposed in a gap between the intermediate polymeric layer 507 and the lower alignment layer 510. The second array of posts is surrounded by the liquid crystal material in the liquid crystal layer 508 confined in the gap.

In this example, electrical components are disposed in a dielectric polymer substrate, including layers 512, 510 500, 504. Electrical components include a resistive layer 502, a polyimide layer 501, a patterned electrode layer 503 disposed over the upper alignment layer 504, and a pad electrode layer 511 below the lower alignment layer 510. In this structure, the response time can be faster than that of the structure described with reference to FIGS. 3A-3D. However, the tunable range may be lesser.

Figure 10:
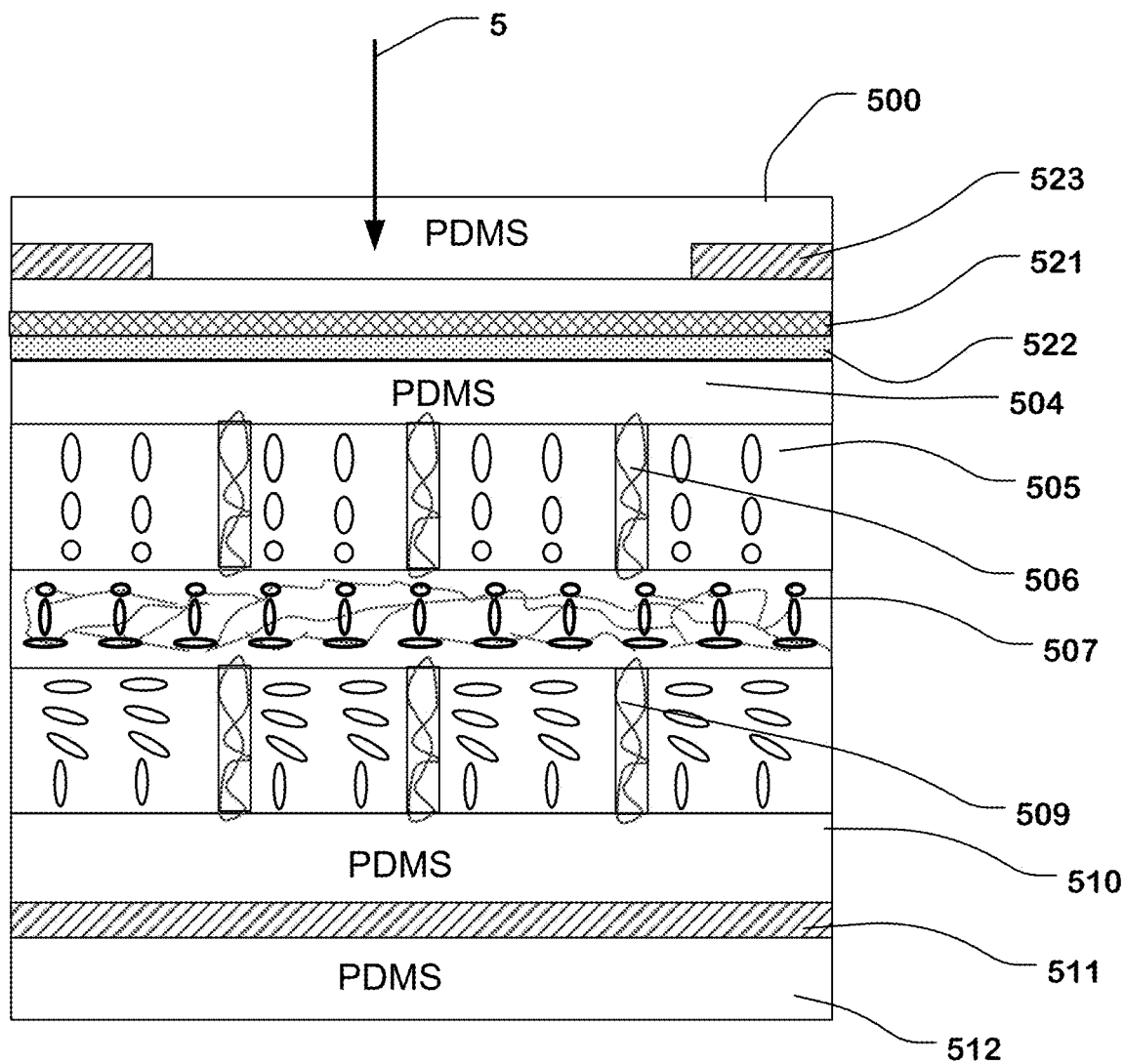
FIG. 10 illustrates an example of a two-layer liquid crystal cell, having hybrid alignment in the liquid crystal layers with an alternative electrode position.

FIG. 10 illustrates an alternative embodiment like that of FIG. 9, and the same reference numbers are used to refer to the same components, and not described again. In this embodiment, the position of the patterned electrode 523 and the resistive film 521/polyimide film 522 structures are reversed, so that the patterned electrode 523 overlies the resistive film 521. Otherwise the structures are similar, and can behave in similar fashions.

The liquid crystal cells of FIG. 9 and FIG. 10 can maintain their optical properties after having been folded over a small radius, and returned to the original shape.

In alternative embodiments, a patterned electrode may not be utilized. A non-uniform electric field can be generated by a pair of transparent pad-shaped electrodes with the addition of dielectric layers having spatially distributed dielectric constants or surfaces into the structure.

Figure 11:
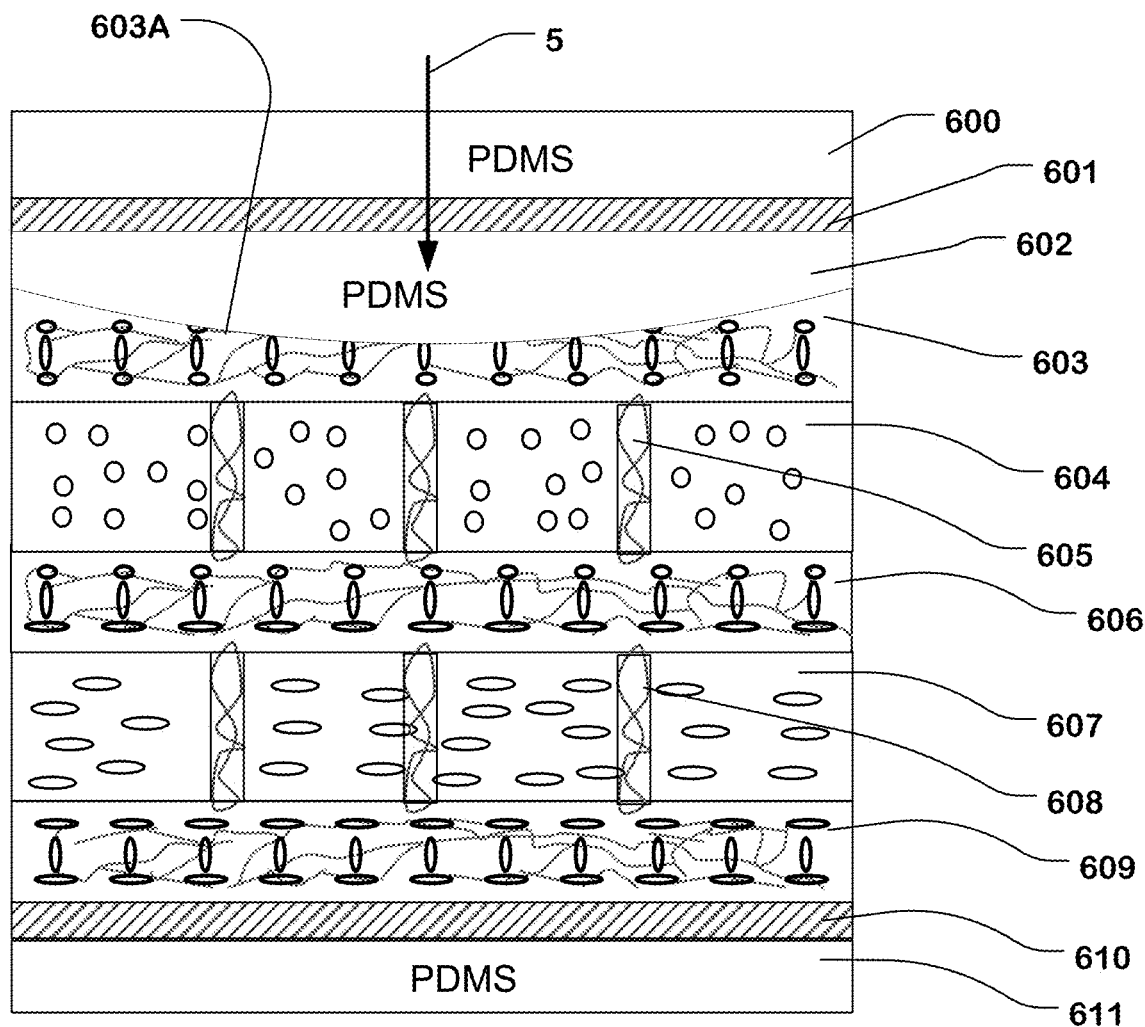
FIG. 11 illustrates an example of a two-layer liquid crystal cell with a curved dielectric layer.

FIG. 11 illustrates one embodiment of the structure having transparent electrodes 601 and 610 without electrode patterning.

The cell shown in FIG. 11 includes a first liquid crystal layer 604 and the second liquid crystal layer 607. The first liquid crystal layer 604 is disposed in a gap between an upper (first) liquid crystal polymeric layer 603 and an intermediate (second) liquid crystal polymeric layer 606. The second liquid crystal layer 607 is disposed in a gap between the intermediate liquid crystal polymeric layer 606 and a lower (third) liquid crystal polymeric layer 609.

The upper polymeric layer 603 has directors on the lower surface adjacent the liquid crystal layer 604 that are orthogonal to the z-axis 5 (parallel to the surface of liquid crystal layer 604) and orthogonal to the plane of the illustration. The intermediate polymeric layer 606 has directors on the upper surface adjacent to the liquid crystal layer 604 that are orthogonal to the z-axis 5 (parallel to the surface of liquid crystal layer 604), and orthogonal to the plane of the illustration (i.e. parallel to the directors on the lower surface of the upper polymeric layer 603). The intermediate polymeric layer 606 has directors on the lower surface adjacent to the liquid crystal layer 607 that are orthogonal to the z-axis 5 (parallel to the surface of liquid crystal layer 607), and parallel to the plane of the illustration (i.e. orthogonal to the directors on the upper surface of the intermediate polymeric layer 606). Lower polymeric layer 609 has directors on its upper surface adjacent to the liquid crystal layer 607 that are orthogonal to the z-axis 5 (parallel to the surface of liquid crystal layer 607) and parallel to the plane of the illustration (i.e. parallel to the directors on the lower surface of the intermediate polymeric layer 606).

The liquid crystal layers 604 and 607 have identical thickness between the polymeric layers, within reasonable manufacturing and optical performance tolerances.

An array of posts (e.g. 605) is disposed in a gap between the upper polymeric layer 603 and the intermediate polymeric layer 606, and is surrounded by the liquid crystal material in the liquid crystal layer 604 confined in the gap. The posts in the array extend from the upper polymeric layer 603 to the intermediate polymeric layer 606, tending to maintain the thickness as discussed above.

A second array of posts (e.g. 608) is disposed in a gap between the intermediate polymeric layer 606 and the lower polymeric layer 609. The second array of posts is surrounded by the liquid crystal material in the liquid crystal layer 607 confined in the gap.

In this example, electrical components are disposed in a dielectric polymer substrate, including layers 600, 602, 611 electrical components include flat transparent electrodes 601 disposed over the upper polymeric layer 603, and flat transparent electrodes 610 below the lower polymeric layer 609.

In this kind of structure, there is no need for a resistive layer or a patterned electrode. However, the overall thickness of the structure can be increased. The polymeric layers 603, 606, 609 act as alignment layers for the liquid crystal layers. The intermediate polymeric layer 606 has orthogonal directors on its upper and lower surfaces. In this example, the upper surface 603A of the upper polymeric layer 603 is curved, along with a matching curve of the dielectric material in layer 602. The curve can result in generation of a non-uniform electric field when a voltage is applied on the flat transparent electrodes 601 and 610.

The liquid crystal cell of FIG. 11 can maintain its optical properties after having been folded over a small radius, and returned to the original shape.

Figure 12:
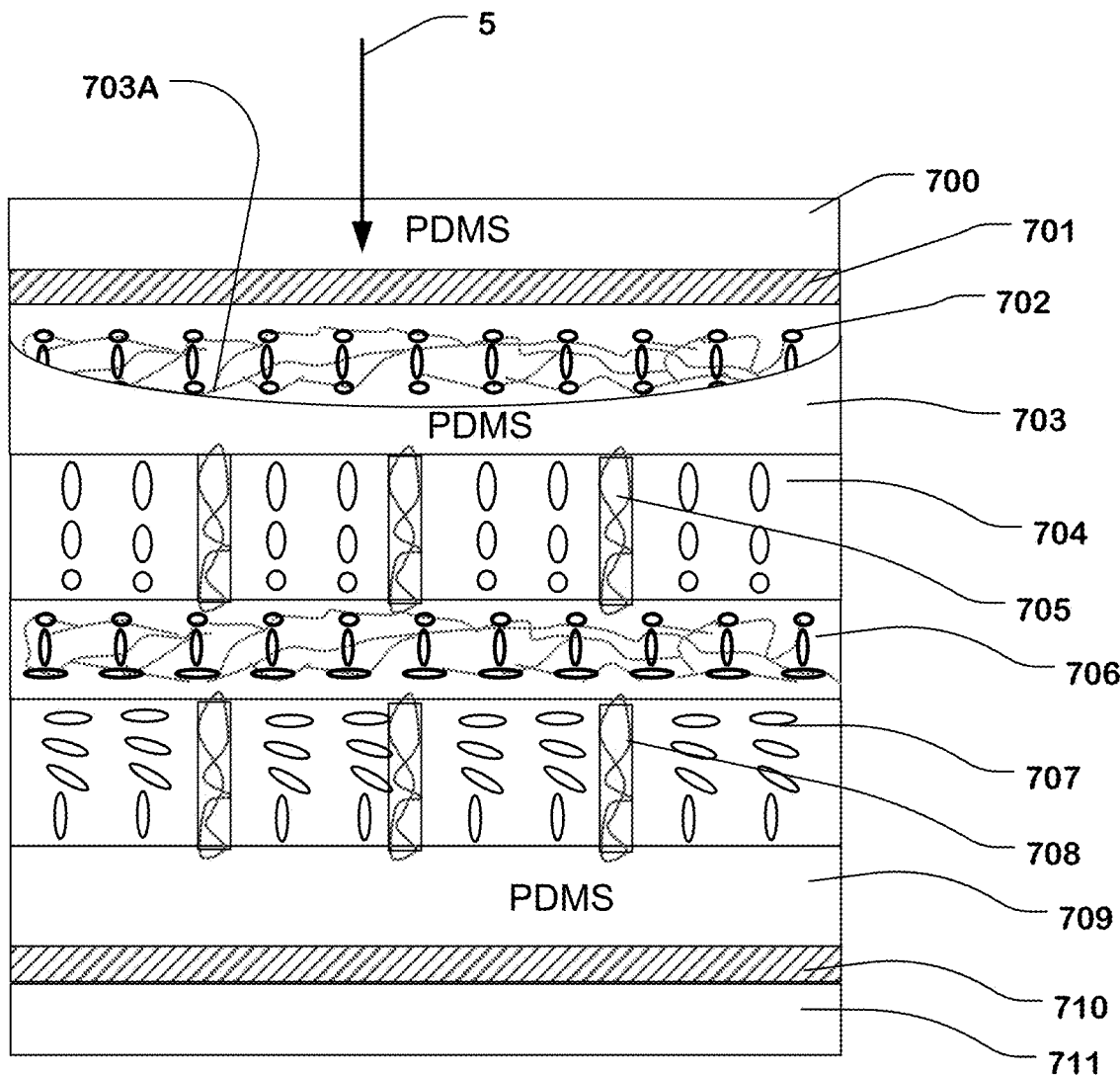
FIG. 12 illustrates another example of a two-layer liquid crystal cell with a curved dielectric layer, with hybrid alignment in the liquid crystal layers.

FIG. 12 illustrates another embodiment in which flat transparent electrodes are used rather than patterned electrodes. In FIG. 12, a two-layer liquid crystal cell utilizing hybrid alignment of the liquid crystal molecules in the liquid crystal layers is illustrated. The cell in FIG. 12 includes a first liquid crystal layer 704 and a second liquid crystal layer 707. The first liquid crystal layer 704 is disposed in a gap between an upper vertical alignment layer 703, which can comprise PDMS for example, and an intermediate polymeric layer 706. The second liquid crystal layer is disposed in a gap between the intermediate polymeric layer 706, and a lower vertical alignment layer 709.

The intermediate polymeric layer 706 has directors on the upper surface adjacent to the liquid crystal layer 704 that are orthogonal to the z-axis 5 (parallel to the surface of liquid crystal layer 704), and orthogonal to the plane of the illustration. The intermediate polymeric layer 706 has directors on the lower surface adjacent to the liquid crystal layer 707 that are orthogonal to the z-axis 5 (parallel to the surface of liquid crystal layer 707), and lie in the plane of the illustration (i.e. orthogonal to the directors on the upper surface of the intermediate polymeric layer 706). A curved polymeric layer 702 is disposed over and in contact with the upper alignment layer 703. This forms a curved surface 703A in the path of the electric field between the flat transparent electrodes 701 and 710.

The PDMS layers act as vertical alignment layers 703, 709 for the structure. As a result, the directors in the liquid crystal layers 704, 707 adjacent to the upper vertical alignment layer 703 and the lower vertical alignment layer 709 are arranged vertically, along the optical path. The directors in the liquid crystal layers twist in orthogonal planes between the upper and lower surfaces as illustrated, because of the alignment function of the intermediate polymeric layer 706.

The liquid crystal layers 704 and 707 have identical thickness between the polymeric layers, within reasonable manufacturing and optical performance tolerances.

An array of posts (e.g. 705) is disposed in a gap between the upper alignment layer 703 and the intermediate polymeric layer 706, and is surrounded by the liquid crystal material in the liquid crystal layer 704 confined in the gap. The posts in the array extend from the upper alignment layer 703 to the intermediate polymeric layer 706, tending to maintain the thickness as discussed above.

A second array of posts (e.g. 708) is disposed in a gap between the intermediate polymeric layer 706 and the lower alignment layer 709. The second array of posts is surrounded by the liquid crystal material in the liquid crystal layer 707 confined in the gap.

In this example, electrical components include a flat transparent electrode layer 701 disposed over the curved polymeric layer 702, and a flat transparent electrode layer 710 below the lower alignment layer 709. Dielectric substrate layers 700, 711 are disposed on the opposing surfaces of the cell.

The liquid crystal cell of FIG. 12 can maintain its optical properties after having been folded over a small radius, and returned to the original shape.

As mentioned above, the orientation of the liquid crystal molecules in the liquid crystal and polymer films can be defined by an external electric field applied during the photo-polymerization. By applying a non-uniform electric field during the process, the resulting liquid crystal polymer film can have a fixed lens power. Using the lens power of liquid crystal polymer lenses in combination with the flexible electroactive components can add lens power to the structure.

Figure 13:
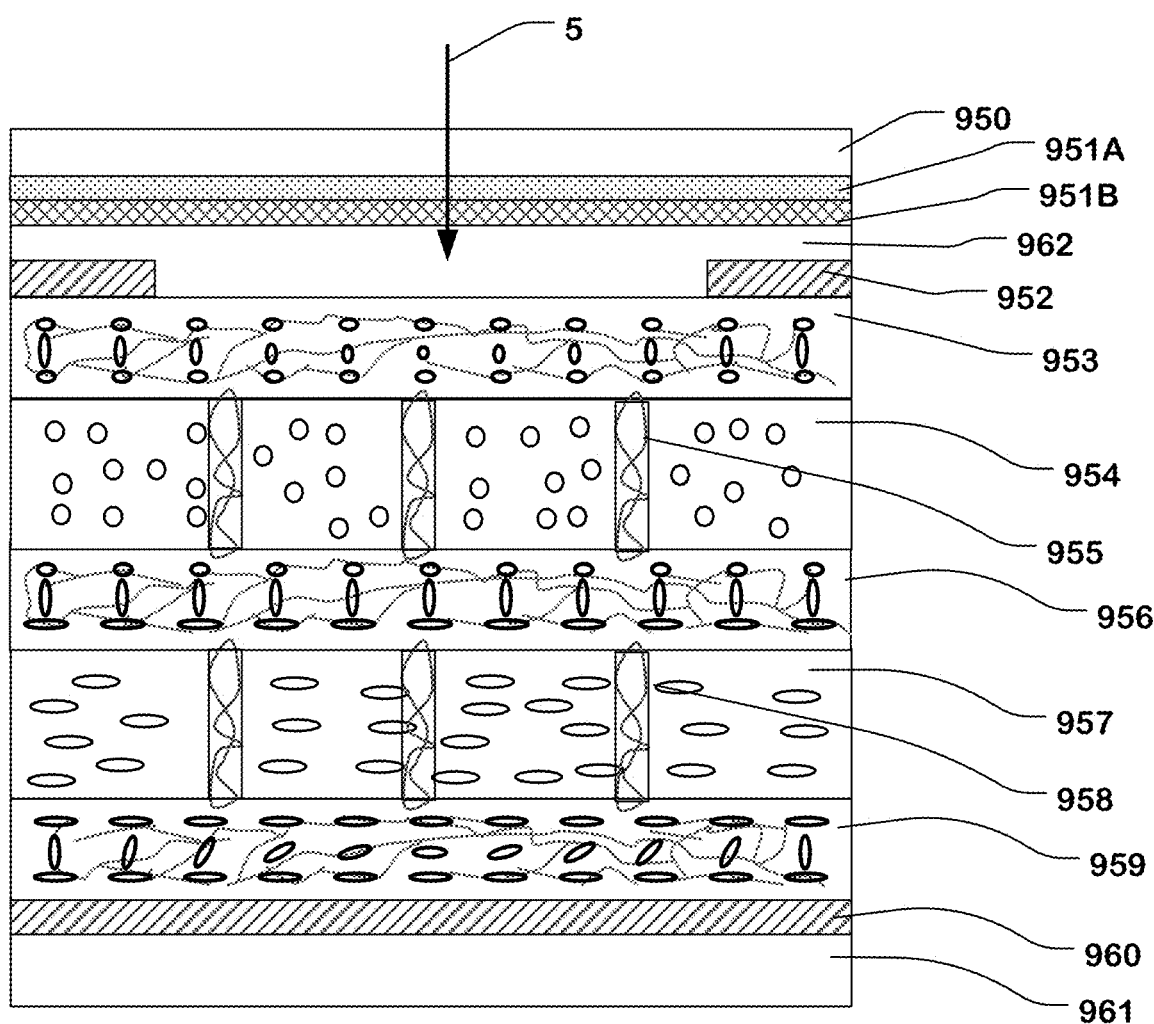
FIG. 13 illustrates an example of a two-layer liquid crystal cell, with lens power in liquid crystal polymeric films.

An example two-layer liquid crystal electroactive cell, with lens power added by the liquid crystal polymeric layers is shown in FIG. 13.

In FIG. 13, the cell includes a first liquid crystal layer 954 and a second liquid crystal layer 957. The first liquid crystal layer 954 is disposed in a gap between an upper (first) liquid crystal polymeric layer 953 and an intermediate (second) liquid crystal polymeric layer 956. The second liquid crystal layer 957 is disposed in a gap between the intermediate liquid crystal polymeric layer 956, and a lower (third) liquid crystal polymeric layer 959.

The upper polymeric layer 953 has directors between its surfaces distributed to induce lens power, and has directors on its upper and lower surfaces that are orthogonal to the z-axis 5 (parallel to the surface of liquid crystal layer 954), and orthogonal to the plane of the illustration. The directors between the surfaces of the upper polymeric layer 953 tilt by amounts that are a function of their location relative to center line of the optical zone, in planes parallel to the z-axis 5, and orthogonal to the plane of the illustration in this example.

The intermediate polymeric layer 956 has directors on the upper surface adjacent to the liquid crystal layer 954 that are orthogonal to the z-axis 5 (parallel to the surface of liquid crystal layer 954), and orthogonal to the plane of the illustration (i.e. parallel to the directors on the lower surface of the upper polymeric layer 953). The intermediate polymeric layer 956 has directors on the lower surface adjacent to the liquid crystal layer 957 that are orthogonal to the z-axis 5 (parallel to the surface of liquid crystal layer 957), and parallel to the plane of the illustration (i.e. orthogonal to the directors on the upper surface of the intermediate polymeric layer 956). The directors between the surfaces and the intermediate polymeric layer 956 are arranged vertically.

Lower polymeric layer 959 has directors between its surfaces distributed to induce lens power, and has directors on its upper and lower surfaces that are orthogonal to the z-axis 5 (parallel to the surface of liquid crystal layer 957) and parallel to the plane of the illustration (i.e. parallel to the directors on the lower surface of the intermediate polymeric layer 956). The directors between the surfaces of the lower polymeric layer 959 tilt by amounts that are a function of their location relative to center line of the optical zone, in planes parallel to the z-axis 5, and parallel to the plane of the illustration in this example. As a result, the orientations of the directors between the surfaces in the upper and lower polymeric layers are orthogonal to one another.

The polymeric layers 953, 956, 959 act as alignment layers for the liquid crystal layers.

The liquid crystal layers 954 and 957 have identical thickness between the polymeric layers, within reasonable manufacturing and optical performance tolerances.

An array of posts (e.g. 955) is disposed in a gap between the upper polymeric layer 953 and the intermediate polymeric layer 956, and is surrounded by the liquid crystal material in the liquid crystal layer 954 confined in the gap. The posts in the array extend from the upper polymeric layer 953 to the intermediate polymeric layer 956, and tend to maintain the thickness as discussed above.

A second array of posts (e.g. 958) is disposed in a gap between the intermediate polymeric layer 956 and the lower polymeric layer 959. The second array of posts is surrounded by the liquid crystal material in the liquid crystal layer 957 confined in the gap.

In this example, electrical components are disposed in a dielectric polymer substrate, including layers 950, 961, 962. Electrical components include a resistive layer 951B, with the contacting polyimide layer 951A, a patterned electrode layer 952 disposed over the upper polymeric layer 953, and a transparent pad electrode layer 960 below the lower polymeric layer 959.

The distributed directors in the upper polymeric layer 953 and the lower polymeric layer 959 provide added lens power to the electroactive cell. In some embodiments, the passive lens power provided by the polymeric layers 953 and 959 can be combined with electroactive power provided by the liquid crystal layers to enable utilization of the lens structure to focus on near objects and on far objects.

The liquid crystal cell of FIG. 13 can maintain its optical properties after having been folded over a small radius, and returned to the original shape.

Figure 14:
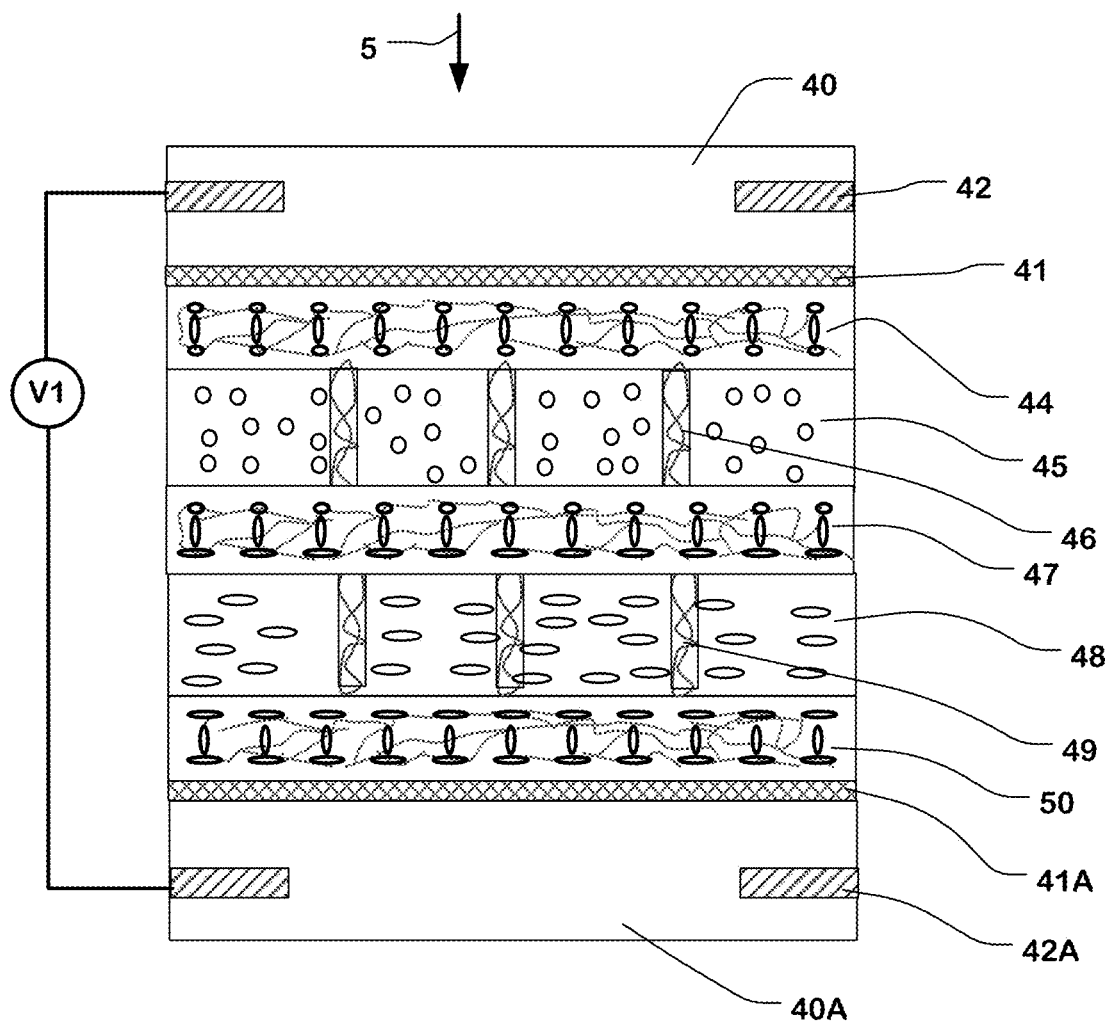
FIG. 14 illustrates an example of a two-layer liquid crystal cell, like that of FIG. 3D, but modified so that the upper and lower electrodes both have patterned openings.

FIG. 14 illustrates an embodiment of a tunable electroactive liquid crystal cell for a lens in which the two-layer liquid crystal cell is modified relative to the structure of FIG. 3D, by removing the pad electrode layer 51 below the second liquid crystal layer 48, and providing a second electrode 42A having a patterned opening. The second electrode 42A is disposed in a dielectric polymer 40A. Also a resistive layer 41A is disposed below the alignment layer 50. The elements of FIG. 14 which are common with the elements of the embodiments of FIGS. 3A-3D have like reference numerals, and are not described again.

The patterned openings in the first electrode 42 and the second electrode 42A can have circular shapes. In some embodiments, the patterned openings have circular shapes with a common radius. In other embodiments, the patterned openings can have circular shapes with different radii. Also, in other embodiments, the patterned openings can have shapes other than circular.

The circular openings in the embodiment of FIG. 14 are disposed in alignment with an aperture of the tunable lens, configured to induce electric field lines, with electric field power, suitable for controlling the alignment of the liquid crystal moieties in the first and second active layers to achieve a tunable lens power.

In alternative embodiments the first and second electrodes 42 and 42A having hole patterned openings which can be replaced using pad electrodes and curved polymeric layers as in the case of FIGS. 11 and 12. Also, in alternatives, passive lens power can be provided using polymeric layers as discussed above.

Figure 15:
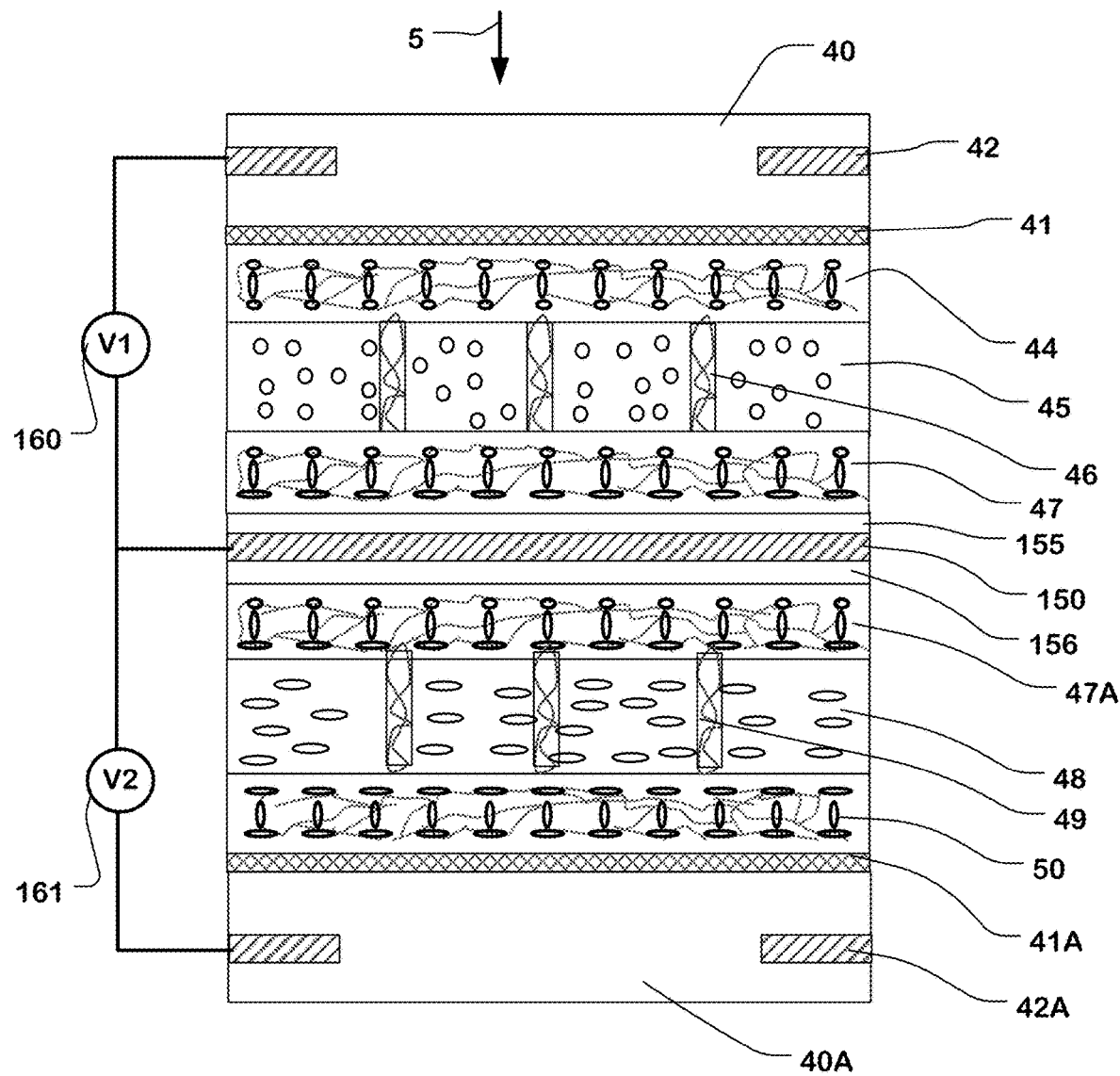
FIG. 15 illustrates an example of a two-layer liquid crystal cell, having an intermediate pad electrode, with first and second outer electrodes having patterned openings.

FIG. 15 illustrates an embodiment of a tunable electroactive liquid crystal cell for a lens in which the two-layer liquid crystal cell is modified relative to the structure of FIG. 14, by inserting a pad electrode 150 between the first and second active layers containing liquid crystal (i.e., liquid crystal layers 45, 48). Elements of FIG. 15 in common with the embodiment of FIG. 14 have like reference numbers and are not described again.

In this embodiment, a transparent flexible pad electrode 150 is disposed in a dielectric polymer 155, 156 below the second alignment layer 47. An additional alignment layer 47A is disposed below the pad electrode 150 and in contact with an upper surface of the second liquid crystal layer 48.

The first and second electrodes 42, 42A can have patterned openings as discussed above in connection with FIG. 14.

A driver including a first drive signal source 160 and a second drive signal source 161 is electrically connected to the first patterned electrode 42 and second patterned electrode 42A to apply a first drive signal for the first liquid crystal layer 45 and a second drive signal for the second liquid crystal layer 48. In some embodiments, the first and second drive signals can be the same, within manufacturing and performance specifications. In other embodiments, the first and second drive signals can differ in at least one of, and in some embodiments more than one of, pulse shape, duty cycle, DC offset, amplitude, and frequency. Characteristics of the drive signals can be determined, for example, by calibration for particular lens powers, and other performance characteristics to be achieved.

In some embodiments, the driver is coupled to the pad electrode 150, and applies a DC reference voltage or ground to the pad electrode. In some embodiments, there can be first and second pad electrodes isolated from one another, and disposed between the first and second active layers (liquid crystal layers). The first drive signal can be coupled between the first electrode and the first pad electrode, and the second drive signal can be coupled between the second electrode and the second pad electrode.

Figure 16:
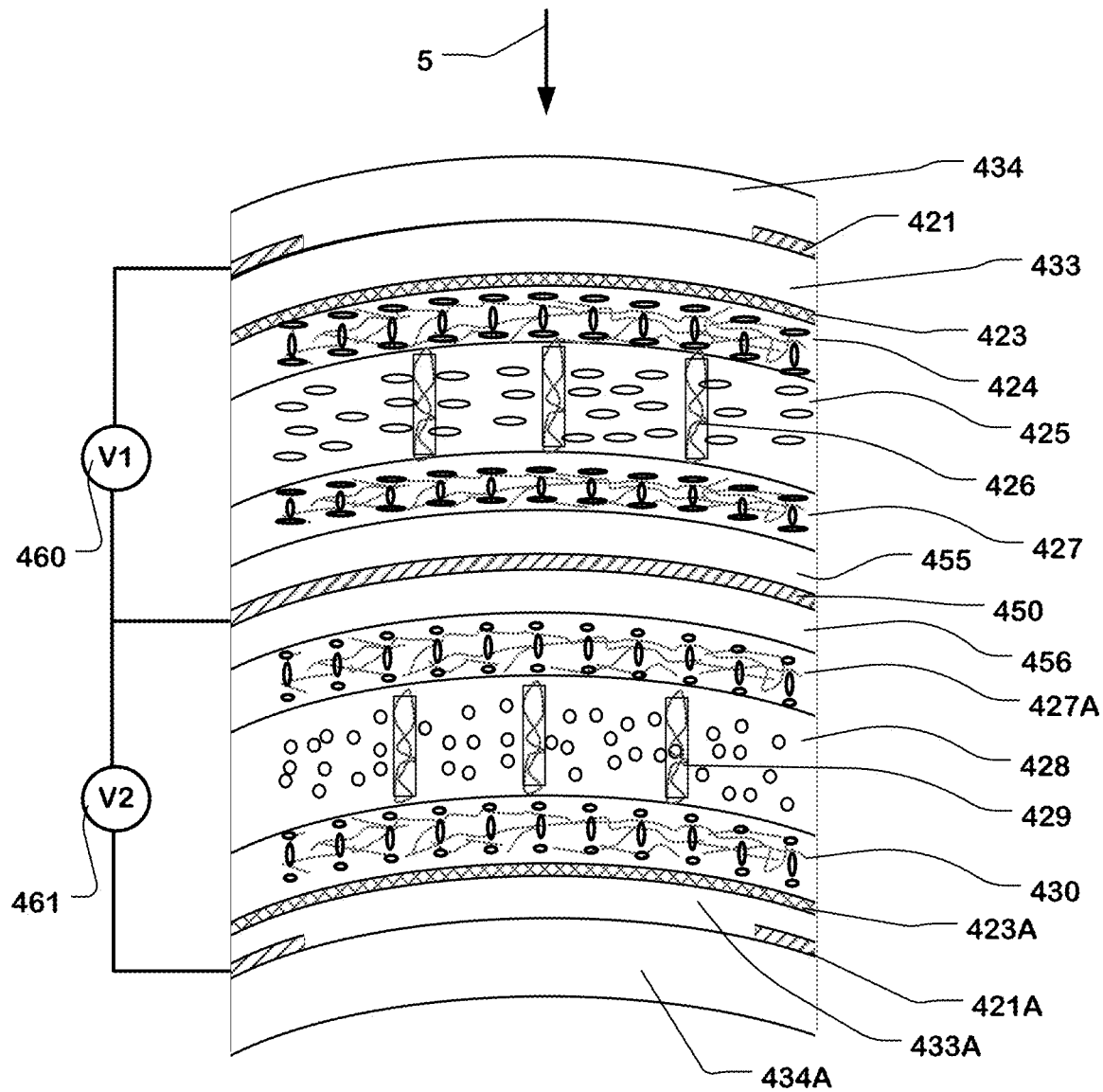
FIG. 16 illustrates an example of a two-layer liquid crystal cell like that of FIG. 15, which is curved rather than flat.

FIG. 16 illustrates an embodiment of a tunable electroactive liquid crystal cell for a lens in which a curved two-layer liquid crystal cell is modified relative to the structure of FIG. 8, by inserting a pad electrode 450 between the first and second active layers (425, 428), and also by replacing the pad electrode of FIG. 8 with a second electrode 421A having a patterned opening such as electrode 42A discussed with reference to FIGS. 14 and 15. Elements of FIG. 16 in common with the structure of FIG. 8 have like reference numbers and are not described again.

In this embodiment, a transparent flexible pad electrode 450 is disposed in a dielectric polymer 455, 456 below the second alignment layer (polymeric layer 427). An additional alignment layer (polymeric layer 427A) is disposed below the pad electrode 450 and in contact with an upper surface of the second liquid crystal layer 428.

The second electrode 421A is disposed in a dielectric polymer 433A, 434A. Also a resistive layer 423A is disposed below the polymeric layer 430.

A driver including a first drive signal source 460 and a second drive signal source 461 is electrically connected to the first patterned electrode 421 and second patterned electrode 421A to apply a first drive signal for the first liquid crystal layer 425 and a second drive signal for the second liquid crystal layer 428. In some embodiments, the first and second drive signals can be the same, within manufacturing and performance specifications. In other embodiments the first and second drive signals can differ in at least one of, and in some embodiments more than one of, pulse shape, duty cycle, DC offset, amplitude and frequency. Characteristics of the drive signals can be determined for example by calibration for particular lens powers, and other performance characteristics to be achieved.

In some embodiments, the driver is coupled to the pad electrode 450, and applies a DC reference voltage or ground to the pad electrode. In some embodiments, there can be first and second pad electrodes isolated from one another, and disposed between the first and second active layers. The first drive signal can be coupled between the first electrode and the first pad electrode, and the second drive signal can be coupled between the second electrode and the second pad electrode.

The disclination effect can be reduced by using alignment layers with strong anchoring strength, such as alignment layers having an anchoring strength greater than $10^{-4}$ J/m$^2$. An alignment layer having sufficient strength can be manufactured as discussed above using polymeric alignment layers.

Figure 17:
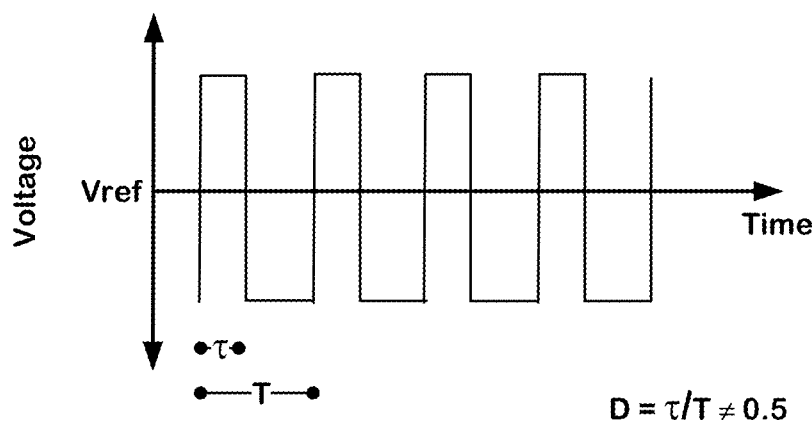
FIG. 17 is a graph showing a drive signal for a liquid crystal cell having a duty cycle configured to induce a DC offset in the active layer.

FIG. 17 is a graph showing a drive signal having a duty cycle that is not equal to 50%. In this example, the drive signal is an AC square wave in which the magnitude of the positive and negative peaks is equal. However, the pulse width τ of the positive going pulse is less than 50% of the period T of the signal. By controlling the duty cycle of the drive signal, a DC offset can be induced in the electric field in the active cell that can modify lens power due to ion effect or flexoelectric effect. In other examples, the drive signal can be a sinusoidal wave, a sawtooth wave, or other signal having different pulse shapes or mixed pulse shapes.

Figure 18:
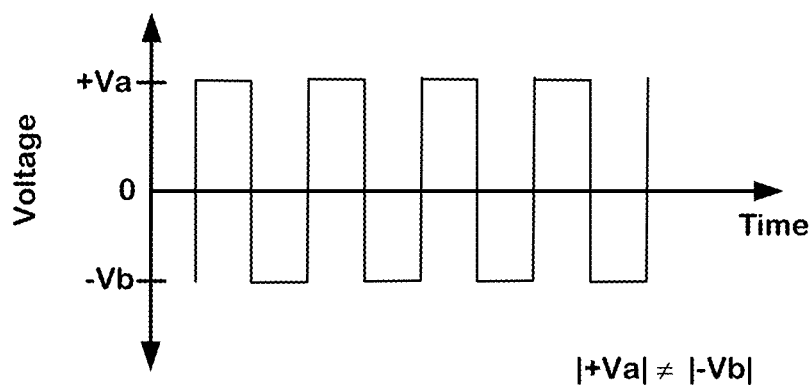
FIG. 18 is a graph showing a drive signal for a liquid crystal cell having a DC offset in the drive signal.

FIG. 18 is a graph showing a drive signal in which the magnitudes of the positive and negative peaks are not equal, inducing a DC offset. In this example, the duty cycle of the drive signal is 50%. By controlling the magnitudes of the positive and negative peaks that produce a DC offset in the drive signal, a DC offset can be induced in the electric field in an active cell that can modify lens power due to ion effect or flexoelectric effect.

In some embodiments, drive signals can be applied that have a combination of adjustable duty cycle, and adjustable magnitudes of the positive and negative peaks.

In some embodiments, the drive signals can be applied using pulse width modulation in order to achieve desired lens power characteristics. The pulse width modulation can be applied using feedback indicating a quality of focus, for example at the selected lens power, in order to control for environmental factors in real time. Lens power of a liquid crystal lens is different under positive voltage or negative voltage due to the ion effect or the flexoelectric effect. Altering pulse width can provide an average voltage with a positive DC offset or a negative DC offset and thus change the lens power.

Other aspects of the drive signals that can be adjusted include the frequency and the magnitude. In general, the frequency and magnitude determine the electric field strength in the liquid crystal layer that is applied to the adjustment of the directors in the liquid crystal moieties.

Figure 19:
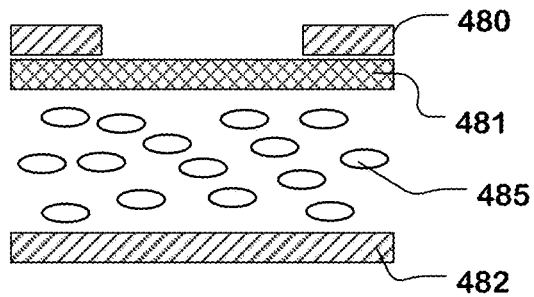
FIG. 19 is a simplified diagram of an active layer having liquid crystal moieties disposed between a hole patterned top electrode and a pad electrode in an unbiased state.

FIG. 19 is a simplified illustration, for the purposes of discussion, of a tunable liquid crystal cell having a first electrode 480 with a patterned opening, the resistive layer 481 to assist dispersion of the electric field lines, and a second electrode 482, such as a pad electrode. The liquid crystal layer is disposed between the first electrode 480 and the second electrode 482. The liquid crystal layer includes liquid crystal, having moieties (e.g. 485) aligned according to alignment layers (not shown) in the cell with an applied bias in a passive state for example. The alignment layers can comprise polymeric alignment layers as discussed in detailed above. The liquid crystal cell can include elastic posts as described above. The liquid crystal cell can be combined with an additional cell as discussed above.

Figure 20:
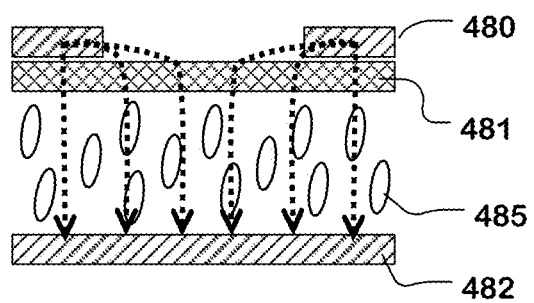
FIG. 20 is a simplified diagram of the structure of FIG. 19 with an initial applied drive signal having a relatively high field power inducing a vertical alignment of the liquid crystal moieties.
Figure 21:
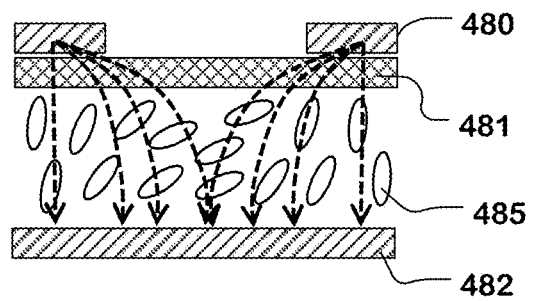
FIG. 21 is a simplified diagram of the structure of FIG. 19, with a subsequent applied drive signal having a lower field power than that of FIG. 20, set to establish a preferred lens power.

FIG. 20 illustrates the liquid crystal cell of FIG. 19 with an applied initial drive signal inducing a relatively high power electric field represented by the field lines extending in a dispersed pattern from the first electrode 480 to the second electrode 482. In response to the initial drive signal, the liquid crystal moieties in the liquid crystal layer can become substantially uniformly vertically aligned. After the initial drive signal is applied, in this embodiment, a drive signal as represented by FIG. 21 is applied having a lower power electric field represented by the field lines extending in a dispersed pattern from the first electrode 480 to the second electrode 482 in FIG. 21. The drive signal of FIG. 21 is applied subsequent to the initial drive signal, and allows the liquid crystal moieties to relax into the desired orientation for the target lens power.

Figure 22:
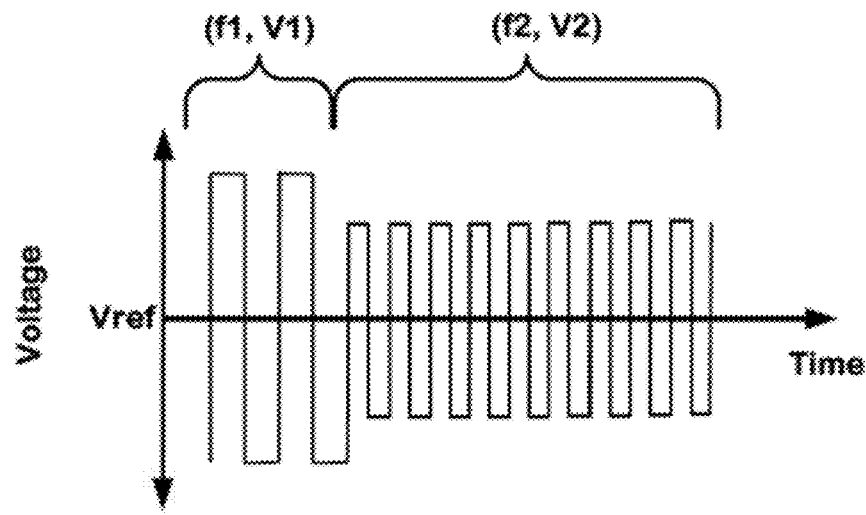
FIG. 22 is a graph showing a drive signal including an initial higher field power interval and a subsequent lower field power interval as discussed with reference to FIGS. 20 and 21.

FIG. 22 is a graph showing a drive signal having an initial higher power interval, followed by a subsequent lower power interval as discussed with reference to FIGS. 21 and 22. In the initial higher power interval, the drive signal has a first frequency f1 and a first magnitude V1 to establish a relatively uniform electric field distribution, as in FIG. 20. In the subsequent lower power interval, the drive signal has a second frequency f2 and a second magnitude V2 to set a lens power as in FIG. 21. Combination of frequency and magnitude establishes an electric field power that can cause controllable alignment of the liquid crystal moieties in the active layer, and can be usable to adjust the lens power in the liquid crystal layer of the cell more quickly with less disinclination on the perimeter of the lens field. The drive signal in the initial higher field power interval can have a lower frequency f1 and a higher magnitude V1 than the frequency f2 and magnitude V2 of the drive signal in the subsequent lower field power interval. In some embodiments, the initial higher power interval can be a single high magnitude pulse, rather than a set of multiple cycles. Other combinations of frequency and magnitude, and drive signals including DC offsets, adjustable duty cycles, and pulse width modulation can be applied as well in various combinations to achieve the initial and subsequent field powers for a particular implementation. In one example, f1, V1 can be 500 Hz, 40 Vrms for 500 milliseconds, while f2, V2 can be 4 KHz, 35 Vrms.

The flexible liquid crystal cell technology described is suitable for use in flexible lenses, such as contact lenses, which can be elastic in the sense that the structure will return to its original shape and original optical properties after having been folded.

Embodiments of flexible liquid crystal cells can include optics that are all polymer based. In some embodiments, the liquid crystal cell can include a polarizer or be polarizer-free. In some embodiments, there is a single liquid crystal layer. In other embodiments there are two or more liquid crystal layers.

The technology described for manufacturing an array of posts within a liquid crystal layer is based on photo-polymerization at low temperature of a mixture including polymer precursors and liquid crystal material. The photo-polymerization induces a phase separation and polymerization of the precursors to form the array of posts, according to a pattern formed using a lithographic mask for example.

Flexible liquid crystal cells described herein can be folded on themselves without breaking, and can be returned to the original shape while recovering optical properties of the electroactive lens.

For example, the thickness of the liquid crystal layers can be maintained before and after folding, such that the average thickness before and after folding remains within 10% of the initial thickness. Also, the thickness of the liquid crystal layers can be a uniform thickness before and after folding, varying for example by less than 1.2 µm from the center of the optic to the edge of the effective aperture of the optic.

The technology is described for implementing flexible optical elements that use liquid crystals to realize electrically tunable optics. The liquid crystal optics can include a pair of liquid crystal layers with orthogonally aligned liquid crystal directors to enable polarizer-free operation, with flexible polymeric alignment layers, flexible substrates and a module for controlling the electric field. Lens power of the liquid crystal optics can be changed by controlling the distribution of the electric field across the entire optical zone. For patients with myopia and presbyopia, a flexible contact lens can be implemented using the technology described herein with a negative lens power for the purposes of focusing on far objects, and an additive lens power for the purposes focusing on near objects. In some examples, the negative lens power can be provided by passive structure of the stack of optical layers, combined with the electro-optic active structure of the liquid crystal layers. Thus, it can be understood that a flexible contact lens can include a flexible optical element that uses liquid crystals, as described herein.

A flexible optical element adopting liquid crystals (LCs) as the materials for realizing electrically tunable optics is described. The LC optics can include a pair of LCs layered with orthogonally aligned LC directors for polarizer-free operation, flexible polymeric alignment layers, flexible substrates, and a module for controlling the electric field. The lens power of the LC optics can be changed by controlling the distribution of electric field across the optical zone. The liquid crystal cells as described herein can be included in a contact lens that comprises a flexible polymer.

For patients with myopia and presbyopia, or hyperopia and presbyopia, simultaneously, a flexible contact lens is described with negative lens power to support focus on far objects and an added positive lens power to support focus on near objects. The LC optics can provide the added positive lens power electrically and can be combined with the flexible contact lens with passive, initial negative lens power for those patients.

Manufacturing processes described herein have been described in a particular order. Some of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a re-arrangement of steps will achieve the same results only if certain conditions are satisfied.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An electrically tunable lens, comprising:
a first alignment layer and a second alignment layer;
an active layer comprising liquid crystal confined between the first and second alignment layers in an optical path of the lens;
a first electrode disposed above the first alignment layer, the first electrode having a first patterned opening disposed over an aperture region of the active layer;
a second electrode disposed below the second alignment layer, the second electrode having a second patterned opening arranged to induce in combination with the first electrode an electric field in the active layer; and
a driver electrically connected to the first and second electrodes, configured to apply a drive signal across the first and second electrodes including
an initial higher field power interval and a subsequent lower field power interval, the lower field power being configured to establish a target lens power during the lower field power interval; wherein
at least one of the first alignment layer and the second alignment layer comprises
a polymeric layer including liquid crystal moieties.

2. The electrically tunable lens of claim 1, wherein
the first and second patterned openings have circular shapes.

3. The electrically tunable lens of claim 1, wherein
the first and second patterned openings have circular shapes with a common radius.

4. The electrically tunable lens of claim 1, including
a first resistive layer disposed above the first alignment layer and
a second resistive layer disposed below the second alignment layer.

5. The electrically tunable lens of claim 1, including
an array of elastic polymer posts in the active layer between the first alignment layer and the second alignment layer, posts in the array extending from the first alignment layer to the second alignment layer.

6. The electrically tunable lens of claim 1, including
a third alignment layer between the first alignment layer and the second alignment layer;
and a second active layer comprising liquid crystal confined between the third alignment layer and the second alignment layer.

7. The electrically tunable lens of claim 6, including
a pad electrode disposed between the first and second active layers.

8. The electrically tunable lens of claim 1, wherein
the active layer has an average thickness X prior to bending over a fold radius less than 10 mm, and an average thickness Y after recovering from the bending, wherein Y=X±10% X.

9. The electrically tunable lens of claim 1, wherein
at least one of the first and second alignment layers has an anchoring strength greater than $10^{-4}$ J/m$^2$.

10. The electrically tunable lens of claim 1, wherein
at least one of the first and second alignment layers comprises
a polymeric layer including liquid crystal moieties, and having an anchoring strength greater than $10^{-4}$ J/m$^2$.

11. The electrically tunable lens of claim 1, wherein
the initial higher field power interval has a first voltage magnitude and
the subsequent lower field power interval has a second voltage magnitude different from the first voltage magnitude.

12. The electrically tunable lens of claim 11, wherein
the initial higher field power interval has a first frequency and
the subsequent lower field power interval has a second frequency different from the first frequency.

13. An electrically tunable lens, comprising:
a first alignment layer, a second alignment layer, a third alignment layer and a fourth alignment layer;
a first active layer comprising liquid crystal confined between the first and second alignment layers in an optical path of the lens;
a second active layer comprising liquid crystal confined between the third and fourth alignment layers in the optical path of the lens;
a first electrode disposed above the first alignment layer, the first electrode having a first patterned opening disposed in alignment with an aperture region of the first active layer; and
a second electrode disposed below the fourth alignment layer,
the second electrode having a second patterned opening disposed in alignment with an aperture region of the second active layer; and
a pad electrode disposed between the first and second active layers; and
a driver electrically connected to the first and second electrodes, configured
to apply a first drive signal to the first electrode and
a second drive signal to the second electrode arranged to induce, in combination with the pad electrode, electric fields in the first and second active layers,
wherein at least one of the first drive signal and the second drive signal includes
an initial higher field power interval and a subsequent lower field power interval,
the lower field power being configured to establish a target lens power during the lower field power interval; wherein
at least one of the first alignment layer and the fourth alignment layer comprises a polymeric layer including liquid crystal moieties.

14. The electrically tunable lens of claim 13, wherein
the first and second patterned openings have circular shapes.

15. The electrically tunable lens of claim 13, wherein
the first and second patterned openings have circular shapes with a common radius.

16. The electrically tunable lens of claim 13, including
a first resistive layer disposed above the first alignment layer and a second resistive layer disposed below the fourth alignment layer.

17. The electrically tunable lens of claim 13, including:
a first array of elastic polymer posts in the first active layer between the first alignment layer and the second alignment layer, posts in the array extending from the first alignment layer to the second alignment layer; and
a second array of elastic polymer posts in the second active layer between the third alignment layer and the fourth alignment layer, posts in the array extending from the third alignment layer to the fourth alignment layer.

18. The electrically tunable lens of claim 13, wherein
the first active layer has an average thickness X prior to bending over a fold radius less than 10 mm, and an average thickness Y after recovering from the bending, wherein Y=X±10% X.

19. The electrically tunable lens of claim 13, wherein
at least one of the first, second, third and fourth alignment layers has an anchoring strength greater than $10^{-4}$ J/m$^2$.

20. The electrically tunable lens of claim 13, wherein
at least one of first, second, third and fourth alignment layers comprises a polymeric layer including liquid crystal moieties, and having an anchoring strength greater than $10^{-4}$ J/m$^2$.

\* \* \* \* \*